US009799086B1

(12) United States Patent
Mattson et al.

(10) Patent No.: US 9,799,086 B1
(45) Date of Patent: Oct. 24, 2017

(54) BUDGET INFORMATION SYSTEM WITH CROSS-REFERENCE FEATURE AND RELATED METHODS

(71) Applicant: SPIDER DATA SERVICES, LLC, Tallahassee, FL (US)

(72) Inventors: Anna J. Mattson, Tallahassee, FL (US); Sherri R. Taylor, Tallahassee, FL (US)

(73) Assignee: SPIDER DATA SERVICES, LLC, Tallahassee, FL (US)

( * ) Notice: Subject to any disclaimer, the term of this patent is extended or adjusted under 35 U.S.C. 154(b) by 0 days.

(21) Appl. No.: 13/795,995

(22) Filed: Mar. 12, 2013

Related U.S. Application Data

(60) Provisional application No. 61/665,692, filed on Jun. 28, 2012.

(51) Int. Cl.
*G06Q 50/26* (2012.01)
*G06Q 40/00* (2012.01)

(52) U.S. Cl.
CPC ............. *G06Q 50/26* (2013.01); *G06Q 40/10* (2013.01)

(58) Field of Classification Search
CPC ......... G06Q 40/02; G06Q 40/00; G06Q 40/12
USPC ........................................................... 705/30
See application file for complete search history.

(56) References Cited

U.S. PATENT DOCUMENTS

| | | | | |
|---|---|---|---|---|
| 6,687,713 | B2 | 2/2004 | Mattson et al. | |
| 2002/0026393 | A1* | 2/2002 | Mattson | G06Q 40/02 705/30 |
| 2003/0018548 | A1* | 1/2003 | Cattaneo | G06Q 40/02 705/30 |
| 2008/0072143 | A1* | 3/2008 | Assadollahi | G06F 3/0236 715/261 |

* cited by examiner

*Primary Examiner* — Shay S Glass
(74) *Attorney, Agent, or Firm* — Allen, Dyer, Doppelt, & Gilchrist, P.A.

(57) ABSTRACT

A budget information device may include a memory and a processor cooperating with the memory for importing and storing different financial databases into the memory. Each different financial database may include numerical data and textual identifiers. The processor and memory may be for processing the numerical data and textual identifiers from the different financial databases. The processor and memory may also be for providing a GUI to a user, the GUI including views for respectively accessing the numerical data and textual identifiers for each of the different financial databases. Each view may include a cross-reference feature for accessing numerical data and textual identifiers associated to numerical data and textual identifiers in a current view.

9 Claims, 39 Drawing Sheets

| | | | |
|---|---|---|---|
| TRANSPARENCY 2.0 101 | | | CONTACT  RESOURCES  LOG OUT |

HOME | PLANNING | $ BUDGET | ACCOUNTING | PERSONNEL | CONTRACTS | ★TRACKING
FY 2012-13 — 91  — 92  — 93  — 94  — 95  — 96  — 97

WELCOME PAGE

Welcome Message...
Welcome to Senate Transparency 2.0, a system which transforms the way we look at Florida government operations. This system was designed with the purpose of empowering you to perform extensive research, develop proposals and cultivate innovative ideas to improve the effectiveness of Florida government. The focus of the site is to be a single source of information that will not only serve as a portal to raise awareness of how government is organized, but it will reveal specific details on programs, functions and the positions that are critical to successful governance and operations.

| | | | DATA SOURCES |
|---|---|---|---|
| 📄 | Planning | Do you want more information about how Florida's state government operates? Gain insightful information about each state agency's planning process along with interesting details about their programs. Use the search tool and locate information on planning for the next budget year. View the agency's program descriptions and find out more about the inner workings of state government. | Agency Governor Legislature |
| $ | Budget | Where are Florida's tax dollars being budgeted? Each year the Legislature appropriates money to each state agency. Follow the budget process beginning with each agency's budget request. Review, research, and report on the final state budget to actually see where the money goes. Use the search tool to locate specific details. | Agency Governor Legislature |
| ⬡ | Accounting | How are Florida's tax dollars being spent? We all have budgets, but do we spend it according to our plans and budget? This module will answer the question: Where does the money go? Follow the money after it is appropriated to see how the state agencies are actually spending it. Use the search tool to isolate and report expenditure details. | Financial Services |
| 👥 | Personnel | Where do state employees work? What are their salaries? Follow the hiring of state employees in this module to see how many people work for state government, where they work, which county they work in, and how much money they make. In this module you can see the details for each position funded in the state budget. | Management Services |
| 📄 | Contracts | Are you interested in knowing more about state contracts? In this module you will find the contracts for each state agency, the names of the vendors, and the value of each state contract. Search the details to locate this and other information. | Governor Financial Services |
| ★ | Tracking | Would you like to combine your research and design your own Tracking? In this module you can isolate and bookmark research links, pointing back to documents and data for all modules within Transparency 2.0 or links to external resources. | All of the above |

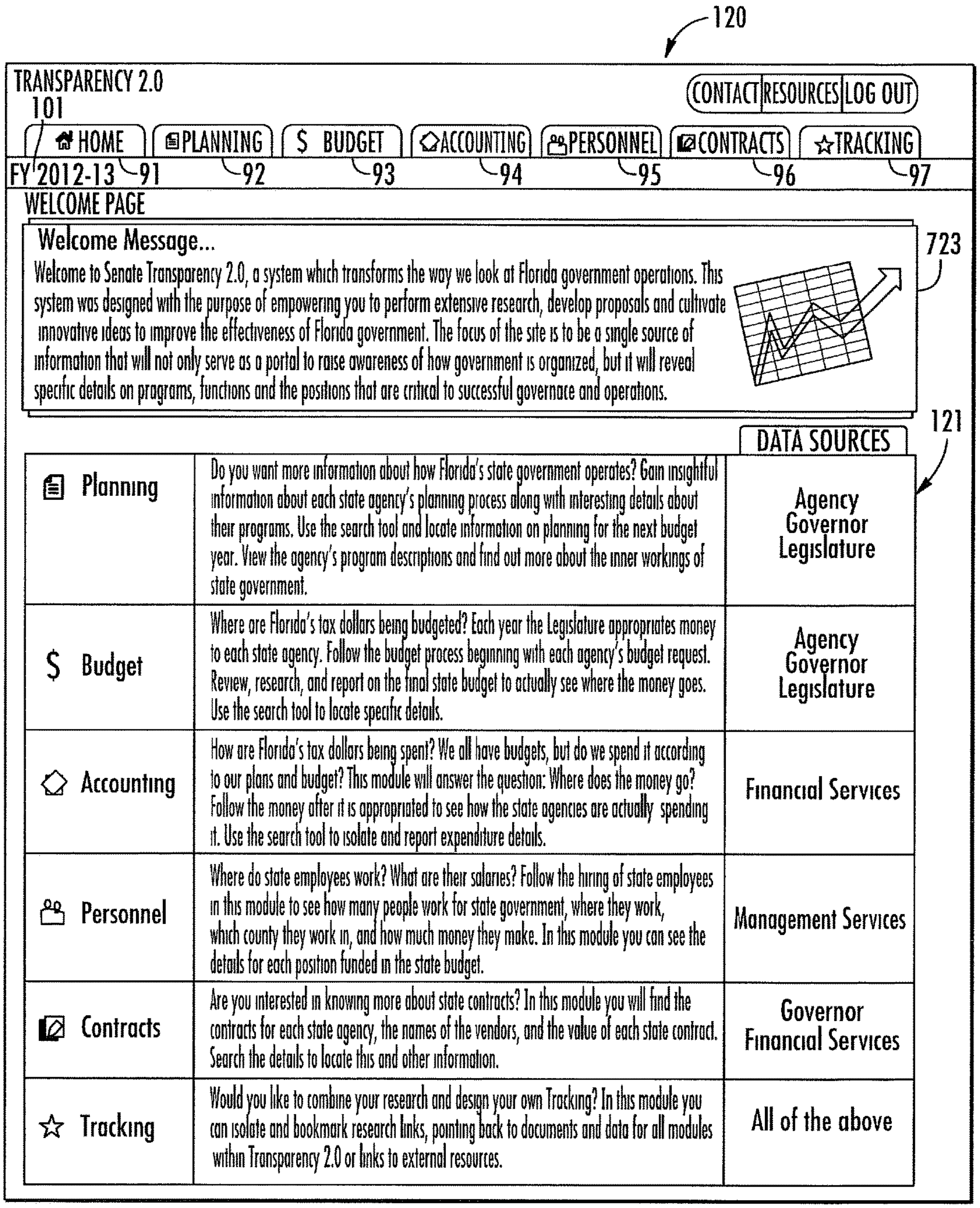

| TRANSPARENCY 2.0 | | | | | | CONTACT \| RESOURCES \| LOG OUT |
|---|---|---|---|---|---|---|
| 🏠 HOME | 🗐 PLANNING | $ BUDGET | ☺ ACCOUNTING | 👥 PERSONNEL | 📝 CONTRACTS | ⭐ TRACKING |
| 101 | 91 | 92 | 93 | 94 | 95 | 96  142  97 |

FY 2012-13                                                                                    fiscal year: 2012-13 ▼

State of Florida
Do you want more information about how Florida's state government operates? Gain insightful information about each state agency's planning process along with interesting details about their programs. Use the search tool and locate information on planning for the next budget year. View the agency's program descriptions and find out more about the inner workings of state government.

BUDGETED:
Agencies: 34
Programs: 353   ⟵ 711

[ALL AGENCY PLANNING DOCUMENTS]

Explore the table below to see a list of planning documents for each state agency. The list includes agency and program planning documents, program summaries, and legal descriptions.

| | AGENCY REQUEST | 141 |
|---|---|---|
| 👤 Education | General Revenue: $13,500,873,741<br>Trust Funds: $7,569,949,093<br>Federal Funds: $2,777,404,513<br>Federal Stimulus: $472,887 | [PLANNING DOCUMENTS] |
| 👥 Human Services | General Revenue: $7,194,043,832<br>Trust Funds: $22,633,986,405<br>Federal Funds: $14,723,528,301<br>Federal Stimulus: $1,140,203,461 | [PLANNING DOCUMENTS] |
| 🛡 Criminal Justice and Corrections | General Revenue: $3,375,551,543<br>Trust Funds: $1,117,490,076<br>Federal Funds: $186,529,117<br>Federal Stimulus: $54,188,163 | [PLANNING DOCUMENTS] |
| 🍃 Natural Resources and Transportation | General Revenue: $174,311,734<br>Trust Funds: $8,537,801,721<br>Federal Funds: $2,614,161,912<br>Federal Stimulus: $67,070,110 | [PLANNING DOCUMENTS] |
| 🏛 General Government | General Revenue: $703,519,285<br>Trust Funds: $3,146,965,368<br>Federal Funds: $1,044,342,858<br>Federal Stimulus: $59,064,569 | [PLANNING DOCUMENTS] |
| ⚖ Judicial Branch | General Revenue: $309,969,587<br>Trust Funds: $182,691,308<br>Federal Funds: $2,036,373<br>Federal Stimulus: $19,818,195 | [PLANNING DOCUMENTS] |

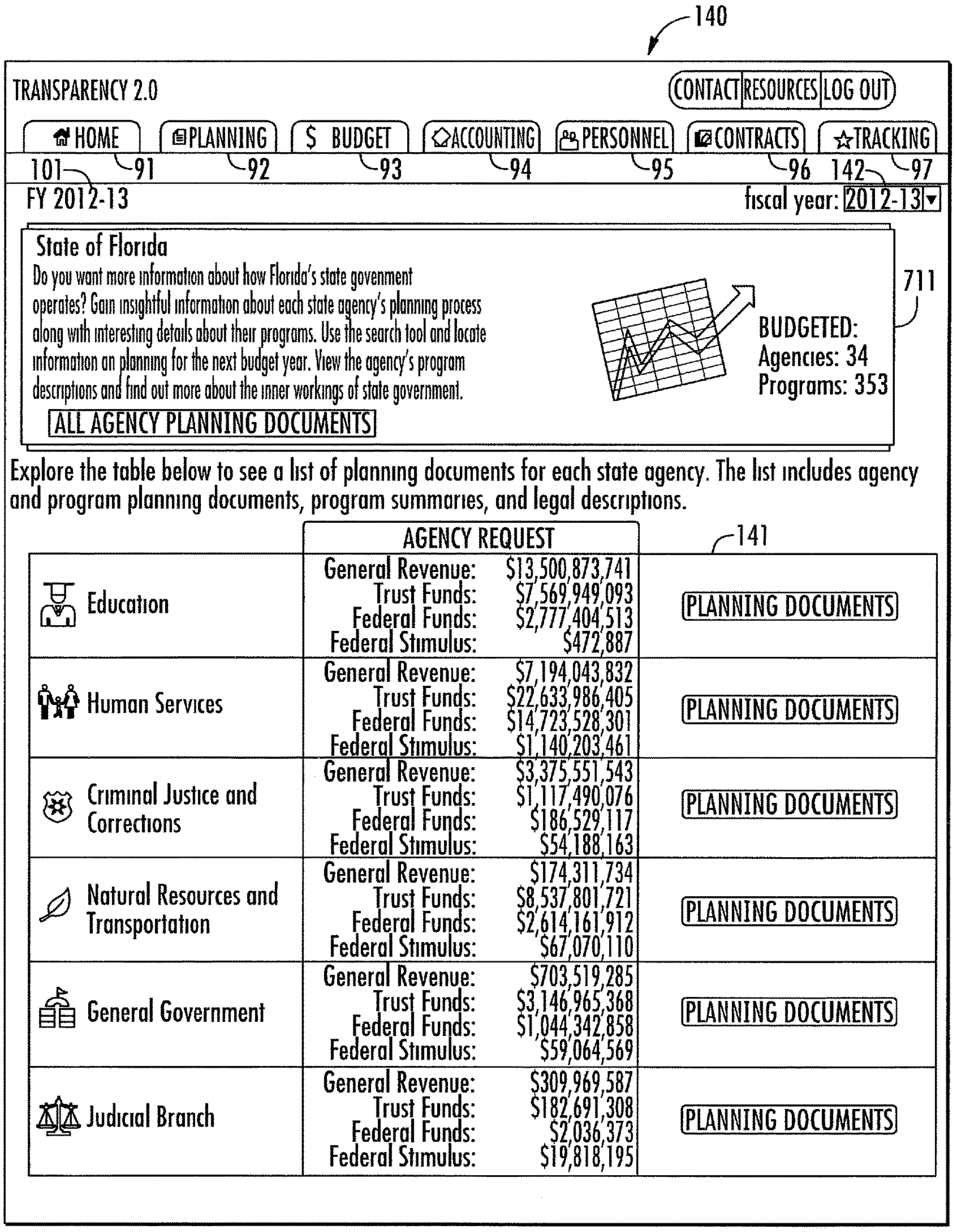

FIG. 3

| TRANSPARENCY 2.0 | | | | | CONTACT | RESOURCES | LOG OUT |
|---|---|---|---|---|---|---|---|
| ⌂ HOME | 🗐 PLANNING | $ BUDGET | ◇ ACCOUNTING | 👥 PERSONNEL | 📄 CONTRACTS | ☆ TRACKING | |
| 101 | 91 | 92 | 93 | 94 | 95 | 96 | 97 |

FY 2012-13  142

DATA AS OF 12/10/2012                                          fiscal year: 2012-13 ▼

State of Florida
Follow the money. How are Florida's tax dollars being spent? We all have budgets, but do we spend it according to our plans and budget? This module will answer the question: Where does the money go? Follow the money after it is appropriated to see how the state agencies are actually spending it. Use the search tool to isolate and report expenditure details.

TOTAL EXPENDITURES: $22,169,264,015  712

[ALL AGENCY ACCOUNTING DOCUMENTS]

Explore the table below to see each agency's expenditures; view and report by budget group, program summary, and expenditure details.

| | EXPENDITURES | Visualize On |
|---|---|---|
| Education | $7,307,712,723 | [ACCOUNTING DOCUMENTS] |
| Human Services | $10,106,986,865 | [ACCOUNTING DOCUMENTS] |
| Criminal Justice and Corrections | $1,656,574,050 | [ACCOUNTING DOCUMENTS] |
| Natural Resources and Transportation | $1,697,836,043 | [ACCOUNTING DOCUMENTS] |
| General Government | $1,229,672,603 | [ACCOUNTING DOCUMENTS] |
| Judicial Branch | $170,481,728 | [ACCOUNTING DOCUMENTS] |

161

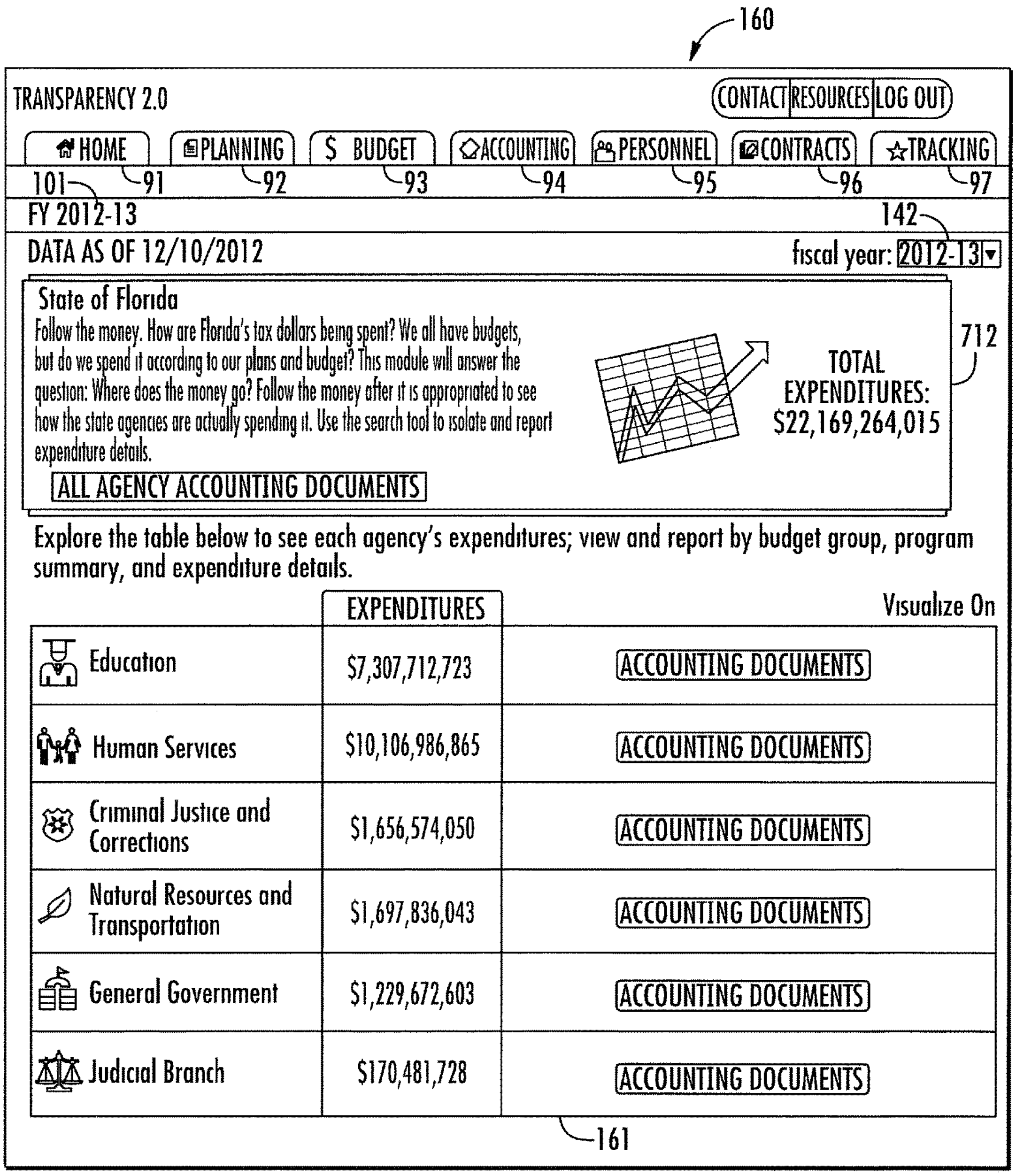

FIG. 4

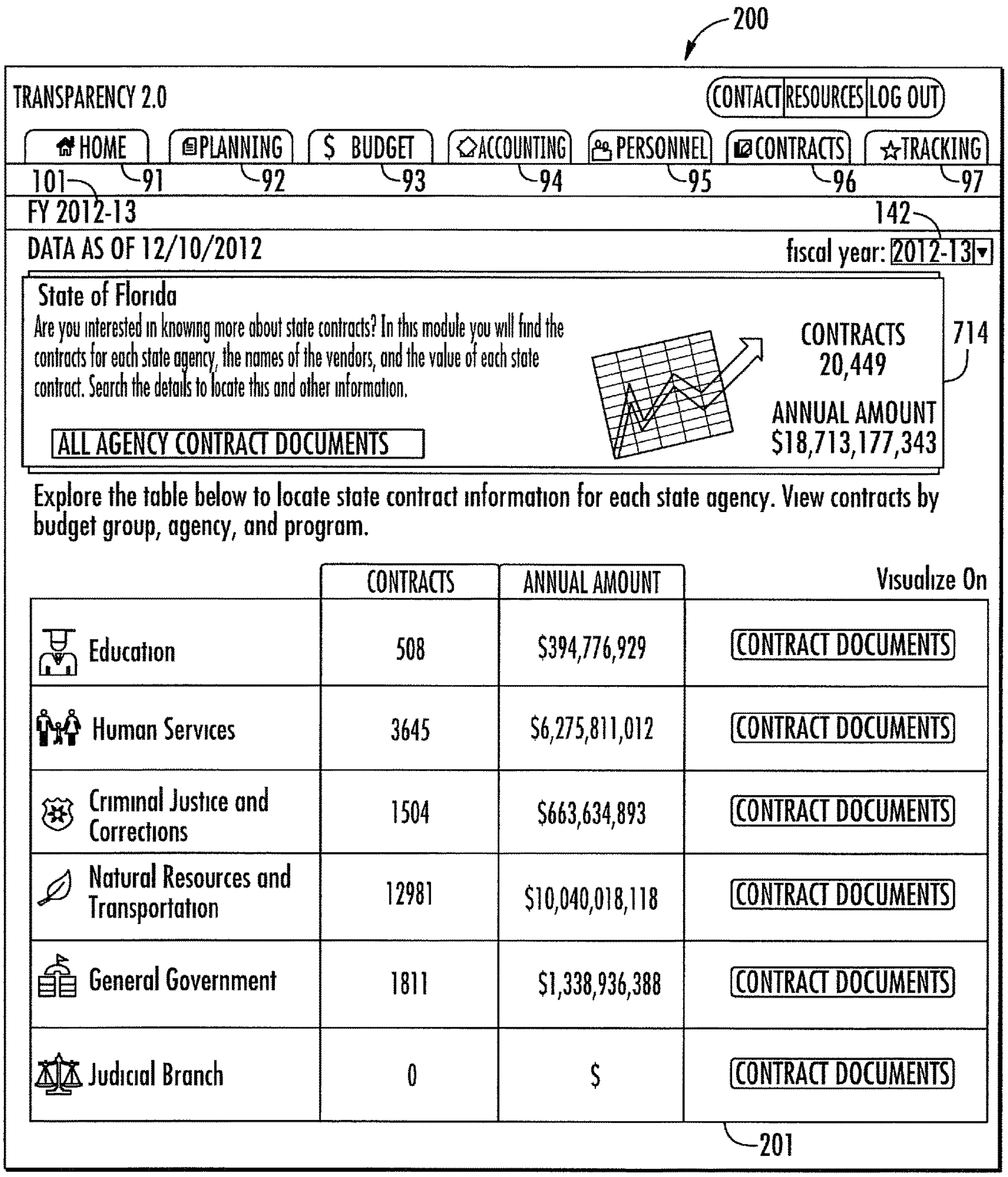

FIG. 6

| | CONTRACTS | ANNUAL AMOUNT | Visualize On |
|---|---|---|---|
| Education | 508 | $394,776,929 | [CONTRACT DOCUMENTS] |
| Human Services | 3645 | $6,275,811,012 | [CONTRACT DOCUMENTS] |
| Criminal Justice and Corrections | 1504 | $663,634,893 | [CONTRACT DOCUMENTS] |
| Natural Resources and Transportation | 12981 | $10,040,018,118 | [CONTRACT DOCUMENTS] |
| General Government | 1811 | $1,338,936,388 | [CONTRACT DOCUMENTS] |
| Judicial Branch | 0 | $ | [CONTRACT DOCUMENTS] |

TRANSPARENCY 2.0 — (CONTACT RESOURCES LOG OUT)

HOME | PLANNING | $ BUDGET | ACCOUNTING | PERSONNEL | CONTRACTS | ★TRACKING

FY 2012-13

DATA AS OF 12/10/2012    fiscal year: 2012-13 ▼

State of Florida
Are you interested in knowing more about state contracts? In this module you will find the contracts for each state agency, the names of the vendors, and the value of each state contract. Search the details to locate this and other information.

[ALL AGENCY CONTRACT DOCUMENTS]

CONTRACTS 20,449
ANNUAL AMOUNT $18,713,177,343

Explore the table below to locate state contract information for each state agency. View contracts by budget group, agency, and program.

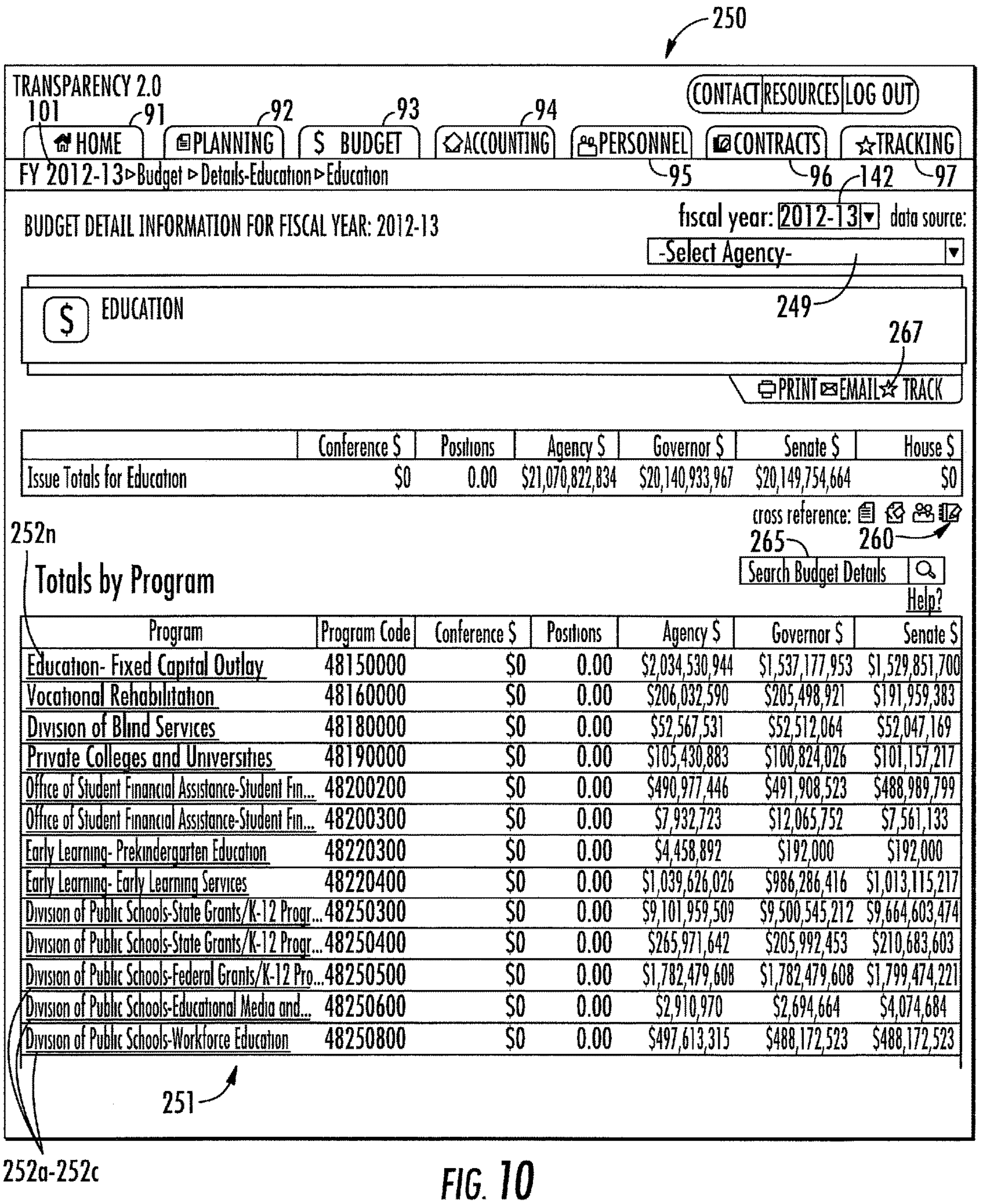

FIG. 10

TRANSPARENCY 2.0
101  91   92   93   94                    CONTACT | RESOURCES | LOG OUT
      HOME | PLANNING | $ BUDGET | ACCOUNTING | PERSONNEL | CONTRACTS | ☆TRACKING
FY 2012-13 ▷ Budget ▷ Details-Education ▷ Education      95    96  142   97

BUDGET DETAIL INFORMATION FOR FISCAL YEAR: 2012-13        fiscal year: 2012-13 ▼  data source:
                                                          -Select Agency-          ▼

$  EDUCATION                                             249
                                                                         267

🖶 PRINT ✉ EMAIL ☆ TRACK

|  | Conference $ | Positions | Agency $ | Governor $ | Senate $ | House $ |
|---|---|---|---|---|---|---|
| Issue Totals for Education | $0 | 0.00 | $21,070,822,834 | $20,140,933,967 | $20,149,754,664 | $0 |

cross reference: 📄 🔗 👥 📋
                      265   260

252n
Totals by Program                                        Search Budget Details 🔍
                                                                        Help?

| Program | Program Code | Conference $ | Positions | Agency $ | Governor $ | Senate $ |
|---|---|---|---|---|---|---|
| Education- Fixed Capital Outlay | 48150000 | $0 | 0.00 | $2,034,530,944 | $1,537,177,953 | $1,529,851,700 |
| Vocational Rehabilitation | 48160000 | $0 | 0.00 | $206,032,590 | $205,498,921 | $191,959,383 |
| Division of Blind Services | 48180000 | $0 | 0.00 | $52,567,531 | $52,512,064 | $52,047,169 |
| Private Colleges and Universities | 48190000 | $0 | 0.00 | $105,430,883 | $100,824,026 | $101,157,217 |
| Office of Student Financial Assistance-Student Fin... | 48200200 | $0 | 0.00 | $490,977,446 | $491,908,523 | $488,989,799 |
| Office of Student Financial Assistance-Student Fin... | 48200300 | $0 | 0.00 | $7,932,723 | $12,065,752 | $7,561,133 |
| Early Learning- Prekindergarten Education | 48220300 | $0 | 0.00 | $4,458,892 | $192,000 | $192,000 |
| Early Learning- Early Learning Services | 48220400 | $0 | 0.00 | $1,039,626,026 | $986,286,416 | $1,013,115,217 |
| Division of Public Schools-State Grants/K-12 Progr... | 48250300 | $0 | 0.00 | $9,101,959,509 | $9,500,545,212 | $9,664,603,474 |
| Division of Public Schools-State Grants/K-12 Progr... | 48250400 | $0 | 0.00 | $265,971,642 | $205,992,453 | $210,683,603 |
| Division of Public Schools-Federal Grants/K-12 Pro... | 48250500 | $0 | 0.00 | $1,782,479,608 | $1,782,479,608 | $1,799,474,221 |
| Division of Public Schools-Educational Media and... | 48250600 | $0 | 0.00 | $2,910,970 | $2,694,664 | $4,074,684 |
| Division of Public Schools-Workforce Education | 48250800 | $0 | 0.00 | $497,613,315 | $488,172,523 | $488,172,523 |

251

TRANSPARENCY 2.0
101

| HOME | PLANNING | $ BUDGET | ACCOUNTING | PERSONNEL | CONTRACTS | TRACKING |

FY 2012-13 ▷ Budget ▷ Details-Education ▷ Education ▷ Issue List

CONTACT | RESOURCES | LOG OUT

BUDGET DETAIL INFORMATION FOR FISCAL YEAR: 2012-13 fiscal year: 2012-13 ▼   data source:
-Select Agency-  ▼

$ PROGRAM: EDUCATION - Fixed Capital Outlay    249
267

🖨 PRINT ✉ EMAIL ☆ TRACK

| Issue Type | Conference $ | Positions | Agency $ | Governor $ | Senate $ | House $ |
|---|---|---|---|---|---|---|
| Capital Outlay | $0 | 0.00 | $2,034,530,944 | $1,537,177,953 | $1,529,851,700 | $0 |
| Total | $0 | 0.00 | $2,034,530,944 | $1,537,177,953 | $1,529,851,700 | $0 |

cross reference: 📄 📂 👥 📝
265   260
Search Budget Details 🔍
Help?

273   272   271
Totals by Issue

| Base Budget | New Issues | Capital Outlay |

| Issue | Issue Code | Conference $ | Positions | Agency $ | Governor $ | Senate $ |
|---|---|---|---|---|---|---|
| ⊟ Type: Capital Outlay (4) | | | | | | |
| Debt Service | 990D000 | $0 | 0.00 | $164,452,902 | $156,649,554 | $127,162,407 |
| Estimated Expenditures- Fixed Capital Outlay | 990I000 | $0 | 0.00 | $1,320,069,293 | $1,320,069,293 | $1,320,069,293 |
| Maintenance And Repair | 990M000 | $0 | 0.00 | $148,265,147 | $55,209,106 | $60,586,594 |
| Education Capital Projects | 990R000 | $0 | 0.00 | $401,743,602 | $5,250,000 | $22,033,406 |
| | | $0 | 0.00 | $2,034,530,944 | $1,537,177,953 | $1,529,851,700 |

276

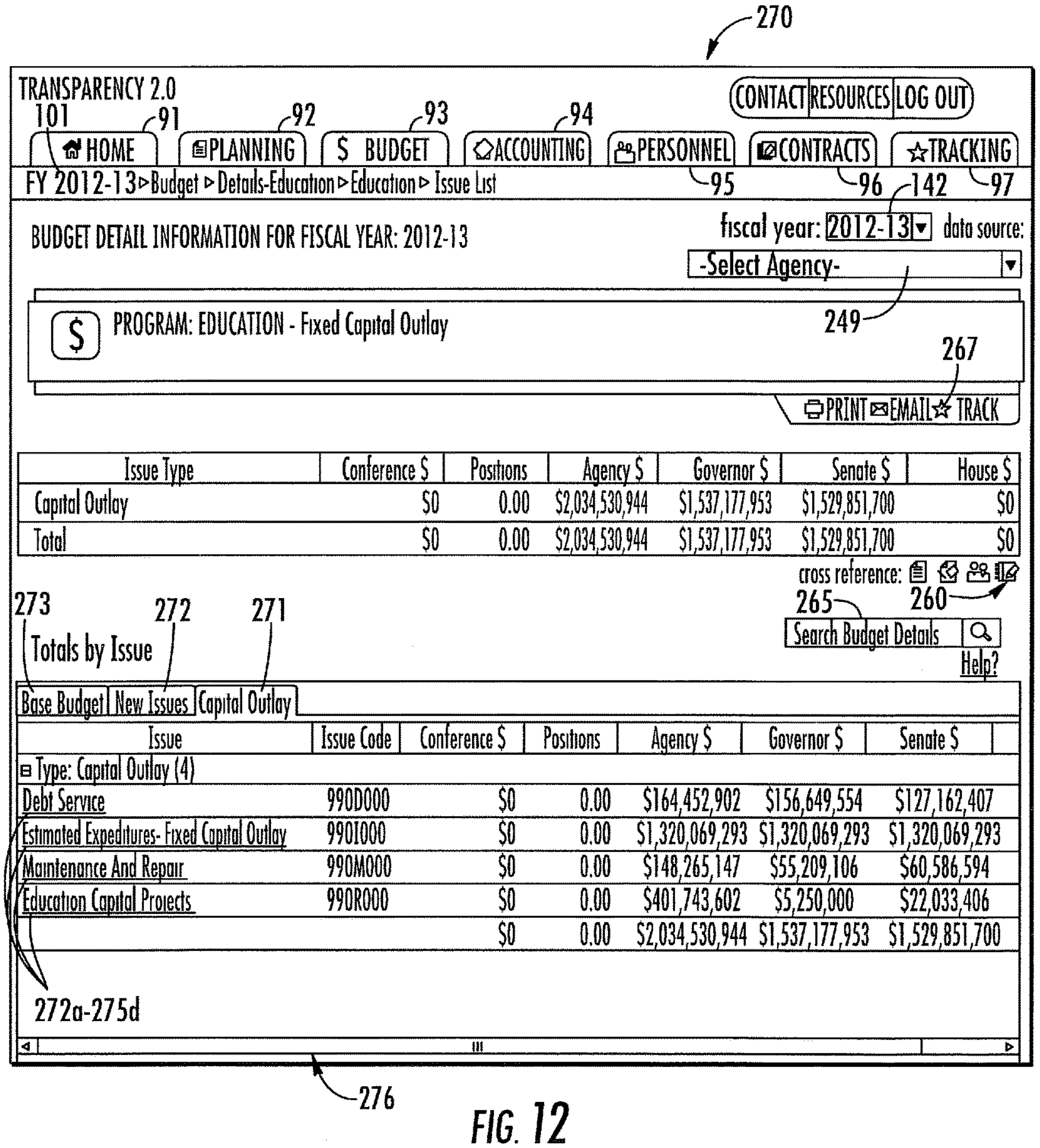

FIG. 12

TRANSPARENCY 2.0 — 280

101  91  92  93  94
🏠HOME | 📋PLANNING | $ BUDGET | ⌂ACCOUNTING | 👥PERSONNEL | 📇CONTRACTS | ☆TRACKING

CONTACT | RESOURCES | LOG OUT

FY 2012-13 ▷ Budget ▷ Details-Education ▷ Education ▷ Issue List    —95   —96   —97

BUDGET DETAIL INFORMATION FOR FISCAL YEAR: 2012-13

( $ ) PROGRAM: EDUCATION - Fixed Capital Outlay
      EDUCATION                                                                    267

🖨PRINT ✉EMAIL ☆TRACK

| Issue Type | Conference $ | Positions | Agency $ | Governor $ | Senate $ | House $ |
|---|---|---|---|---|---|---|
| Estimated Expenditures- Fixed Capital Overlay | | 0.00 | $1,320,069,293 | $1,320,069,293 | $1,320,069,293 | |

cross reference: 📄 📊 👥 📝  —260

283                                               279a    279b
Displaying 2 of 4 Budget Issues              ◁ PREVIOUS | NEXT ▷

🖨PRINT ✧EXPORT  —284  —285  —286  —287  —288  —289

| Agency | Governors Recommendation | Pending House Bill | Senate Bill 2000 | Pending Conference Bill | Agency Narrative | Governor's Narrative |
|---|---|---|---|---|---|---|

| Appropriation Category | AC Code | Fund Title | Fund Code | Fund Source | Amount | Positions |
|---|---|---|---|---|---|---|
| DEBT SERVICE | 089070 | SCH/DIS & CC/DIS CO&DS TF | 2612 | STATE FUNDS-NONMATCHING | $106,980,326 | 0.00 |
| DEBT SERVICE | 089070 | PUBLIC ED CO&DS TRUST... | 2555 | STATE FUNDS-NONMATCHING | $1,002,923,283 | 0.00 |
| DEBT SERVICE | 089070 | CAP IMPROVEMENTS FEE TF | 2071 | STATE FUNDS-NONMATCHING | $27,282,443 | 0.00 |
| G/A- SCHOOL DIST/CC | 089075 | SCH/DIS & CC/DIS CO&DS TF | 2612 | STATE FUNDS-NONMATCHING | $28,000,000 | 0.00 |
| CLS SZ RDCT-LOT CAP OUTLAY | 089090 | EDUCATIONAL ENHANCE... | 2178 | STATE FUNDS-NONMATCHING | $154,883,241 | 0.00 |

281

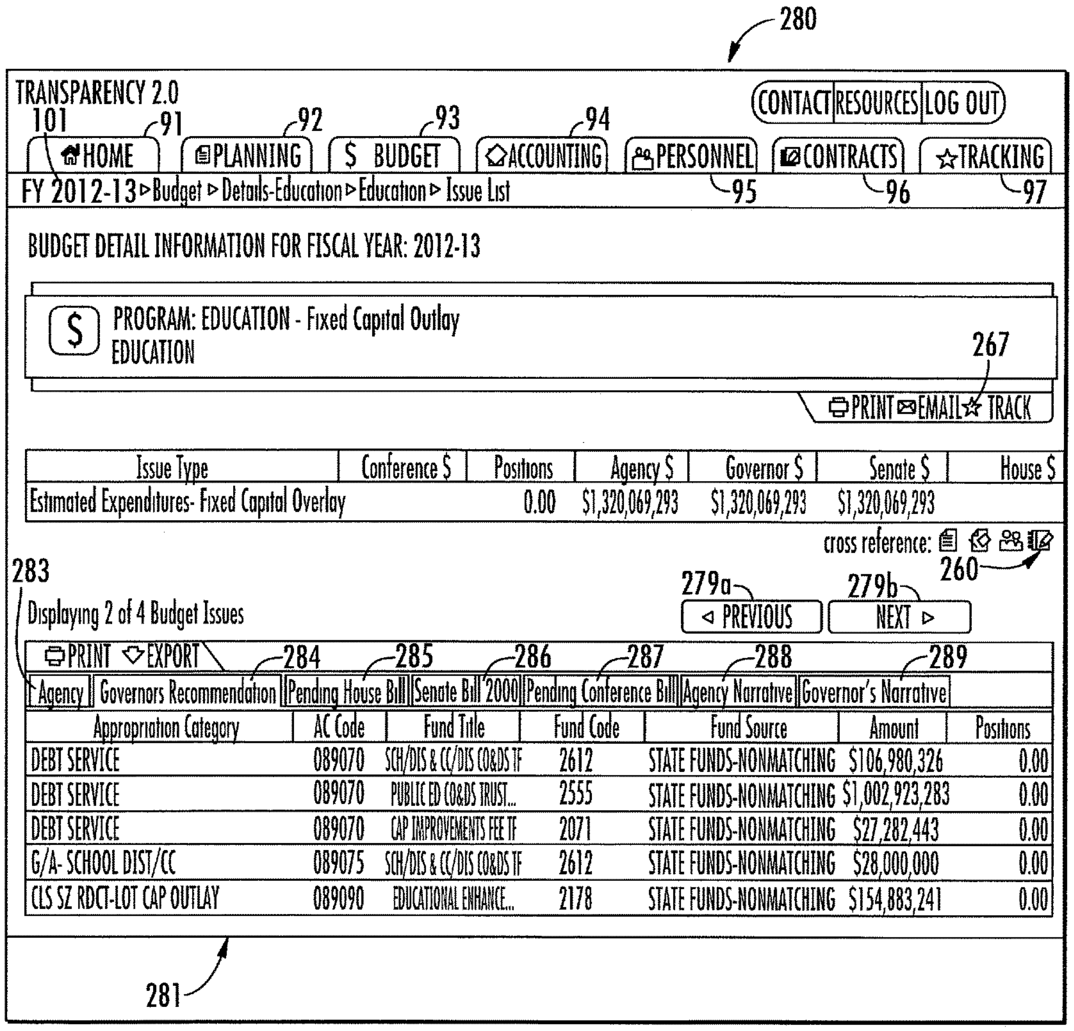

FIG. 13

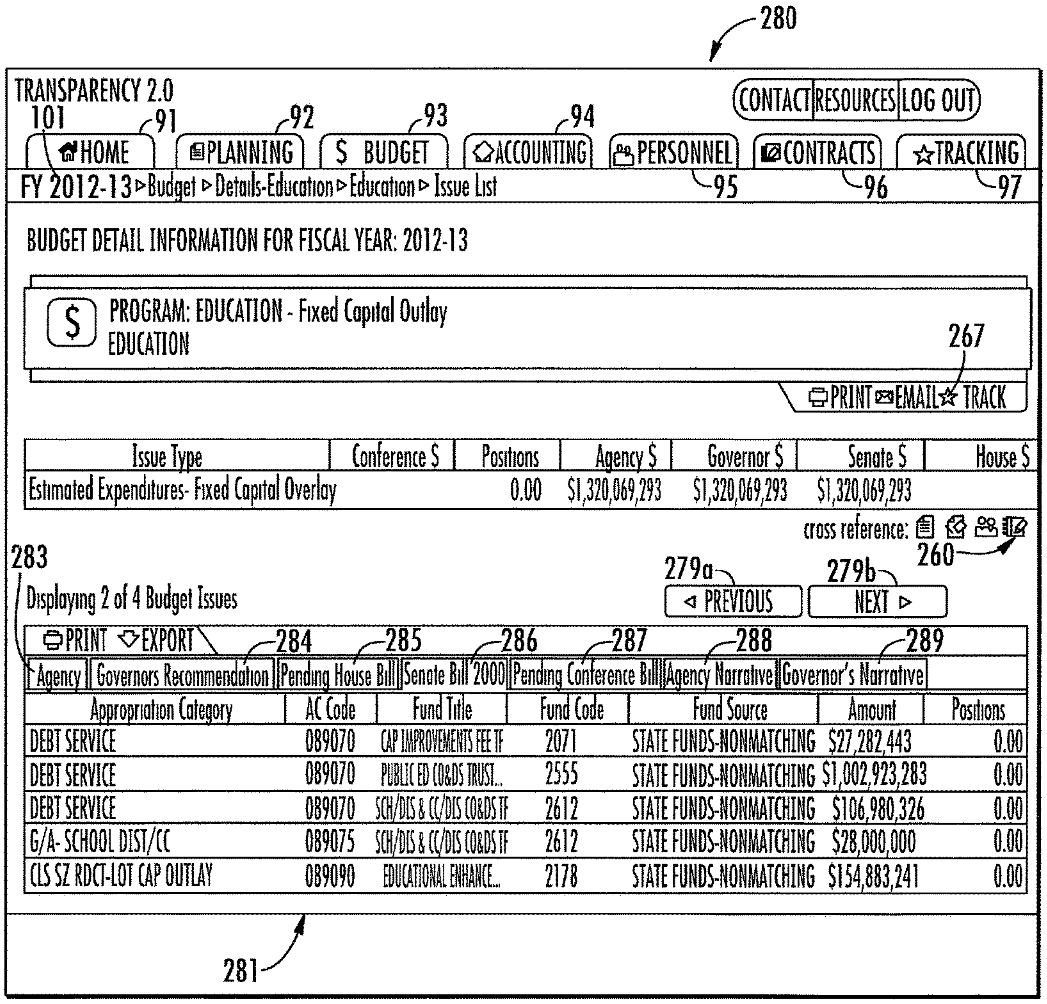

FIG. 14

| | | | | | | | |
|---|---|---|---|---|---|---|---|
| TRANSPARENCY 2.0 | | | | | CONTACT | RESOURCES | LOG OUT |
| 101 | 91 | 92 | 93 | 94 | | | |
| | 🏠HOME | 📖PLANNING | $ BUDGET | ⌂ACCOUNTING | 👥PERSONNEL | 📄CONTRACTS | ☆TRACKING |
| FY 2012-13▷Budget ▷ Details-Education▷Education ▷ Issue List | | | | | 95 | 96 | 97 |

BUDGET DETAIL INFORMATION FOR FISCAL YEAR: 2012-13

[$] PROGRAM: EDUCATION - Fixed Capital Outlay
EDUCATION                                                                                       267

🖨PRINT ✉EMAIL ☆TRACK

| Issue Type | Conference $ | Positions | Agency $ | Governor $ | Senate $ | House $ |
|---|---|---|---|---|---|---|
| Estimated Expenditures- Fixed Capital Overlay | 0.00 | | $1,320,069,293 | $1,320,069,293 | $1,320,069,293 | |

cross reference: 📄 📧 👥📋
260

283
Displaying 2 of 4 Budget Issues                                   279a ◁ PREVIOUS    279b NEXT ▷

🖨PRINT ⇩EXPORT  284   285   286   287   288   289

| Agency | Governors Recommendation | Pending House Bill | Senate Bill 2000 | Pending Conference Bill | Agency Narrative | Governor's Narrative | |
|---|---|---|---|---|---|---|---|
| Appropriation Category | AC Code | Fund Title | Fund Code | Fund Source | | Amount | Positions |
| DEBT SERVICE | 089070 | CAP IMPROVEMENTS FEE TF | 2071 | STATE FUNDS-NONMATCHING | | $27,282,443 | 0.00 |
| DEBT SERVICE | 089070 | PUBLIC ED CO&DS TRUST... | 2555 | STATE FUNDS-NONMATCHING | | $1,002,923,283 | 0.00 |
| DEBT SERVICE | 089070 | SCH/DIS & CC/DIS CO&DS TF | 2612 | STATE FUNDS-NONMATCHING | | $106,980,326 | 0.00 |
| G/A- SCHOOL DIST/CC | 089075 | SCH/DIS & CC/DIS CO&DS TF | 2612 | STATE FUNDS-NONMATCHING | | $28,000,000 | 0.00 |
| CLS SZ RDCT-LOT CAP OUTLAY | 089090 | EDUCATIONAL ENHANCE... | 2178 | STATE FUNDS-NONMATCHING | | $154,883,241 | 0.00 |

281

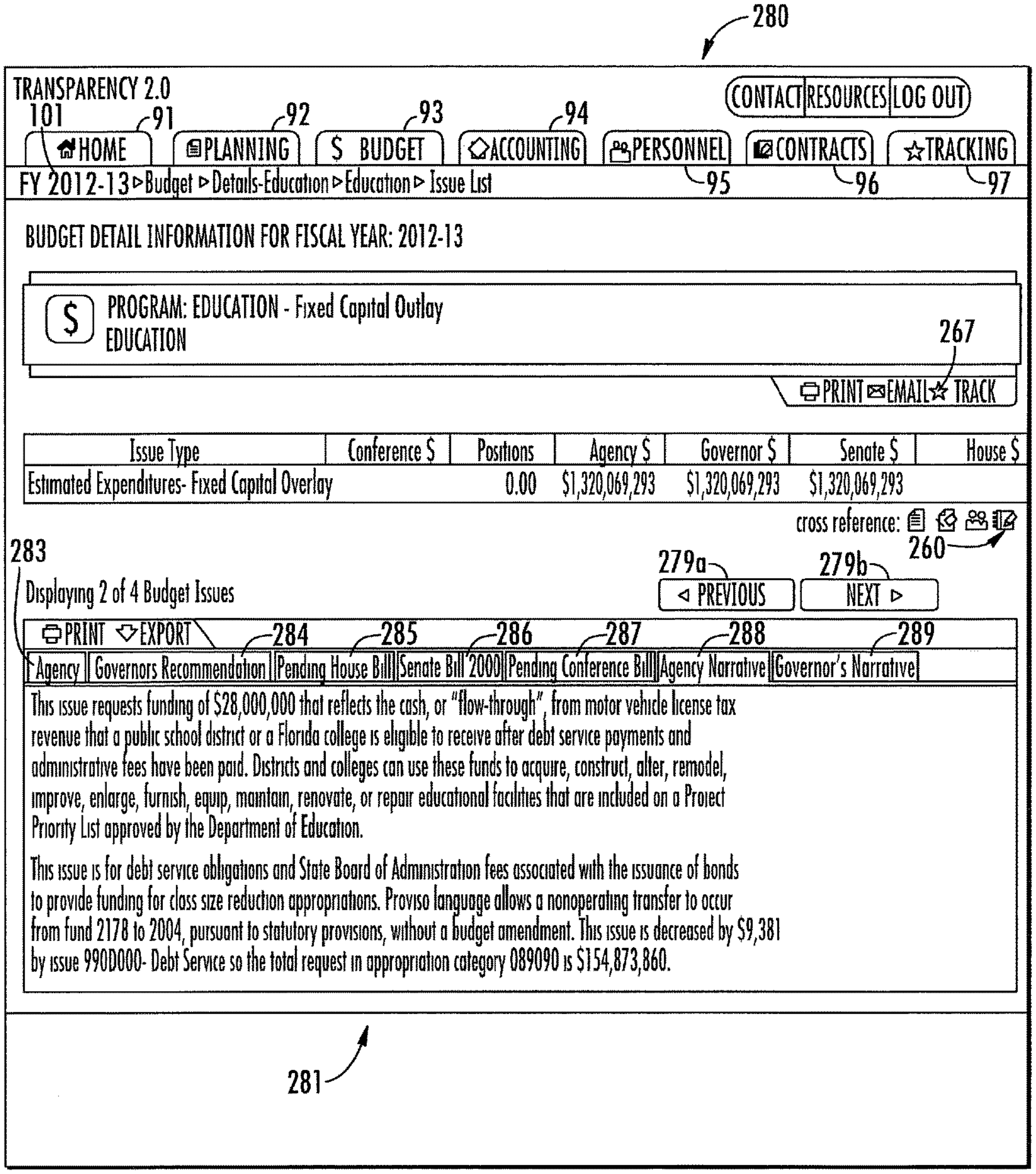

FIG. 15

TRANSPARENCY 2.0
101  ,91    ,92    ,93    ,94         CONTACT|RESOURCES|LOG OUT
  HOME  PLANNING  $ BUDGET  ACCOUNTING  PERSONNEL  CONTRACTS  ☆TRACKING
FY 2012-13▷Budget ▷Details-Education▷Education▷ Issue List        ⌐95   ⌐96   ⌐97

BUDGET DETAIL INFORMATION FOR FISCAL YEAR: 2012-13

$ | PROGRAM: EDUCATION - Fixed Capital Outlay
    EDUCATION                                                      267

🖨 PRINT ✉ EMAIL ☆ TRACK

| Issue Type | Conference $ | Positions | Agency $ | Governor $ | Senate $ | House $ |
|---|---|---|---|---|---|---|
| Estimated Expenditures- Fixed Capital Overlay | | 0.00 | $1,320,069,293 | $1,320,069,293 | $1,320,069,293 | |

cross reference: 📄 📧 👥 📋
260

283
                                              279a       279b
Displaying 2 of 4 Budget Issues              ◁ PREVIOUS  NEXT ▷

🖨 PRINT  ⇩ EXPORT   ⌐284   ⌐285   ⌐286   ⌐287   ⌐288   ⌐289

| Agency | Governors Recommendation | Pending House Bill | Senate Bill 2000 | Pending Conference Bill | Agency Narrative | Governor's Narrative |

This issue requests funding of $28,000,000 that reflects the cash, or "flow-through", from motor vehicle license tax
revenue that a public school district or a Florida college is eligible to receive after debt service payments and
administrative fees have been paid. Districts and colleges can use these funds to acquire, construct, alter, remodel,
improve, enlarge, furnish, equip, maintain, renovate, or repair educational facilities that are included on a Project
Priority List approved by the Department of Education.

This issue is for debt service obligations and State Board of Administration fees associated with the issuance of bonds
to provide funding for class size reduction appropriations. Proviso language allows a nonoperating transfer to occur
from fund 2178 to 2004, pursuant to statutory provisions, without a budget amendment. This issue is decreased by $9,381
by issue 990D000- Debt Service so the total request in appropriation category 089090 is $154,873,860.

281

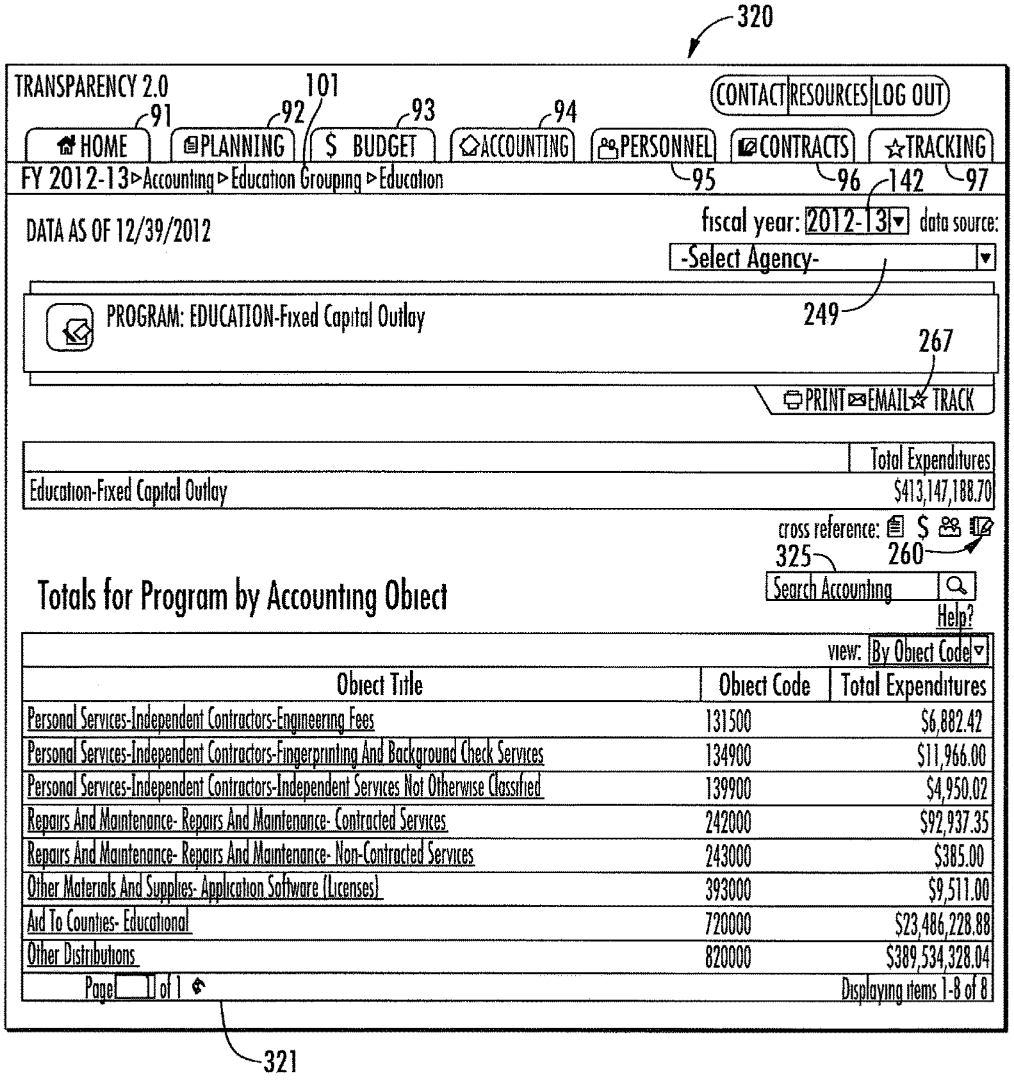

FIG. 21

TRANSPARENCY 2.0     101
       91      92      93      94                    CONTACT RESOURCES LOG OUT
    HOME  | PLANNING | $ BUDGET | ACCOUNTING | PERSONNEL | CONTRACTS | ★TRACKING
FY 2012-13 ▷ Accounting ▷ Education Grouping ▷ Education    95        96  142  97

DATA AS OF 12/39/2012                              fiscal year: 2012-13 ▼  data source:
                                                   -Select Agency-             ▼

PROGRAM: EDUCATION-Fixed Capital Outlay            249
                                                         267

⎯ PRINT ✉ EMAIL ☆ TRACK

|  | Total Expenditures |
|---|---|
| Education-Fixed Capital Outlay | $413,147,188.70 |

cross reference: 📄 $ 👥 📝
                 325    260

Totals for Program by Accounting Object          Search Accounting  🔍
                                                                        Help?

view: By Object Code ▼

| Object Title | Object Code | Total Expenditures |
|---|---|---|
| Personal Services-Independent Contractors-Engineering Fees | 131500 | $6,882.42 |
| Personal Services-Independent Contractors-Fingerprinting And Background Check Services | 134900 | $11,966.00 |
| Personal Services-Independent Contractors-Independent Services Not Otherwise Classified | 139900 | $4,950.02 |
| Repairs And Maintenance- Repairs And Maintenance- Contracted Services | 242000 | $92,937.35 |
| Repairs And Maintenance- Repairs And Maintenance- Non-Contracted Services | 243000 | $385.00 |
| Other Materials And Supplies- Application Software (Licenses) | 393000 | $9,511.00 |
| Aid To Counties- Educational | 720000 | $23,486,228.88 |
| Other Distributions | 820000 | $389,534,328.04 |
| Page ☐ of 1 ⟲ | | Displaying items 1-8 of 8 |

320

321

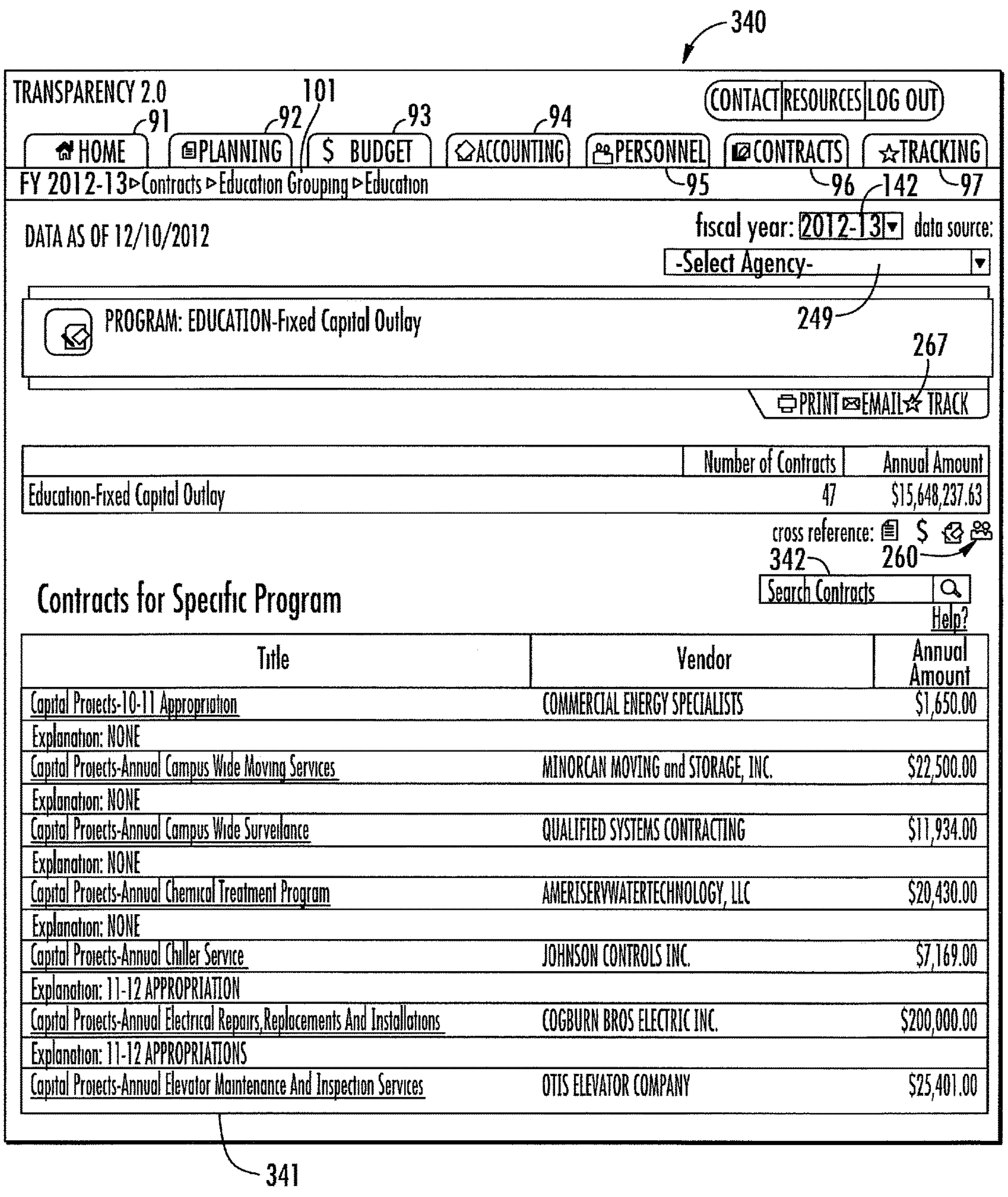

| TRANSPARENCY 2.0 | 101 | | | CONTACT | RESOURCES | LOG OUT |
|---|---|---|---|---|---|---|

91 92 93 94

[🏠 HOME] [📋 PLANNING] [$ BUDGET] [⌂ ACCOUNTING] [👥 PERSONNEL] [📄 CONTRACTS] [☆ TRACKING]

FY 2012-13 ▷ Contracts ▷ Education Grouping ▷ Education     95   96 ⌐142 ⌐97

DATA AS OF 12/10/2012     fiscal year: [2012-13 ▼] data source:
-Select Agency- ▼

PROGRAM: EDUCATION-Fixed Capital Outlay    249

267

🖨 PRINT ✉ EMAIL ☆ TRACK

| | Number of Contracts | Annual Amount |
|---|---|---|
| Education-Fixed Capital Outlay | 47 | $15,648,237.63 |

cross reference: 📄 $ ⌂ 👥
342⌐ 260⌐

Contracts for Specific Program

Search Contracts 🔍
Help?

| Title | Vendor | Annual Amount |
|---|---|---|
| Capital Projects-10-11 Appropriation | COMMERCIAL ENERGY SPECIALISTS | $1,650.00 |
| Explanation: NONE | | |
| Capital Projects-Annual Campus Wide Moving Services | MINORCAN MOVING and STORAGE, INC. | $22,500.00 |
| Explanation: NONE | | |
| Capital Projects-Annual Campus Wide Surveillance | QUALIFIED SYSTEMS CONTRACTING | $11,934.00 |
| Explanation: NONE | | |
| Capital Projects-Annual Chemical Treatment Program | AMERISERVWATERTECHNOLOGY, LLC | $20,430.00 |
| Explanation: NONE | | |
| Capital Projects-Annual Chiller Service | JOHNSON CONTROLS INC. | $7,169.00 |
| Explanation: 11-12 APPROPRIATION | | |
| Capital Projects-Annual Electrical Repairs, Replacements And Installations | COGBURN BROS ELECTRIC INC. | $200,000.00 |
| Explanation: 11-12 APPROPRIATIONS | | |
| Capital Projects-Annual Elevator Maintenance And Inspection Services | OTIS ELEVATOR COMPANY | $25,401.00 |

⌐341

| | | | |
|---|---|---|---|
| 68501500 | Entity Description | | State Budgeting System Entity Description |
| 68700000 | PROGRAM: HEALTH CARE REGULATION | | |
| 68700700 | HEALTH CARE REGULATION | | |
| 68700700 | Entity Description | | State Budgeting System Entity Description |
| 68700700 | What are the applicable Statutes? | | Legislature- Office of Program Policy Analysis and Government Accountability |
| 68700700 | Purpose of the Division/Program | | Legislature- Office of Program Policy Analysis and Government Accountability |
| 68700700 | How is the Division/Program organized? | | Legislature- Office of Program Policy Analysis and Government Accountability |
| 68700700 | How does the Division/Program perform its mission? | | Legislature- Office of Program Policy Analysis and Government Accountability |
| 68700700 | Current Issues | | Legislature- Office of Program Policy Analysis and Government Accountability |
| 68700700 | Where can I get more information? | | Legislature- Office of Program Policy Analysis and Government Accountability |
| 68700700 | Who do I contact? | | Legislature- Office of Program Policy Analysis and Government Accountability |
| 68700700 | Program Summary for Health Care Regulation | | Legislature- Office of Program Policy Analysis and Government Accountability |
| 68700700 | Health Care Regulation- Trends and Conditions | | Agency Long Range Program Plan |
| 68700700 | Leased Space | | Agency Capital Improvements Plans |

*FIG. 31*

Agency for Health Care Administration- Health Care Regulation Cross Reference

| Planning | $ Budget | Accounting | Personnel | Contracts | fiscal year: 2012-13 |
|---|---|---|---|---|---|

| | Amount | Positions |
|---|---|---|
| **2012-13** | | |
| Agency | $65,657,836 | 658.00 |
| Governor | $65,506,103 | 659.00 |
| House | | |
| Senate | $66,275,255 | 662.00 |
| Conference | | |

*FIG. 32*

╱─ 520
  91     92  101    93        94         95          96        97
  │      │  │       │         │          │           │         │
  ┌─────────┬─────────┬──────────┬──────────┬───────────┬──────────┬──────────┐
  │🏠HOME   │📋PLANNING│ $ BUDGET │ ⌂ACCOUNTING│👥PERSONNEL│📄CONTRACTS│☆TRACKING│
  └─────────┴─────────┴──────────┴──────────┴───────────┴──────────┴──────────┘
  FY 2012-13▷Budget▷Details-All Agencies▷Agency for Health Care Administration    ╱─142

BUDGET DETAIL INFORMATION FOR FISCAL YEAR: 2012-13        fiscal year: [2012-13▼] data source:
                                                            -Select Agency-                ▼

┌─────┐                                            249 ╱
  │ $   │  Agency for Health Care Administration
  └─────┘                                                                          267
                                                                                    │
                                                                🖶PRINT ✉EMAIL ☆TRACK

| | Conference $ | Positions | Agency $ | Governor $ | Senate $ | House $ |
|---|---|---|---|---|---|---|
| Issue Totals for Agency for Health Care Administration | $0 | 0.00 | $22,227,000,239 | $20,547,064,951 | $22,921,632,563 | $0 |

cross reference: 📄 📋 👥 📄
                                                                    265╱  260╱

Totals by Program                              Search Budget Details  🔍
                                                                         Help?

| Program | Program... | Agency $ | Positions | Governor $ | Positions | Senate $ | Positions |
|---|---|---|---|---|---|---|---|
| Administration and Support | 68200000 | $263,216,195 | 250.00 | $261,693,698 | 249.00 | $262,490,836 | 249.00 |
| Health Care Services-Children's Special Health Care | 68500100 | $517,502,789 | 0.00 | $517,502,789 | 0.00 | $539,160,556 | 0.00 |
| Health Care Services-Executive Direction and Support Services | 68500200 | $234,594,865 | 747.00 | $228,934,457 | 747.00 | $247,623,281 | 760.00 |
| Health Care Services-Medicaid Services To Individuals | 68501400 | $16,514,135,927 | 0.00 | $14,643,398,345 | 0.00 | $17,092,471,417 | 0.00 |
| Health Care Services-Medicaid Long Term Care | 68501500 | $4,631,892,627 | 0.00 | $,830,029,559 | 0.00 | $4,713,611,218 | 0.00 |
| Health Care Regulation | 68700700 | $85,657,836 | 658.00 | $65,506,103 | 659.00 | $66,275,255 | 662.00 |

╱─525

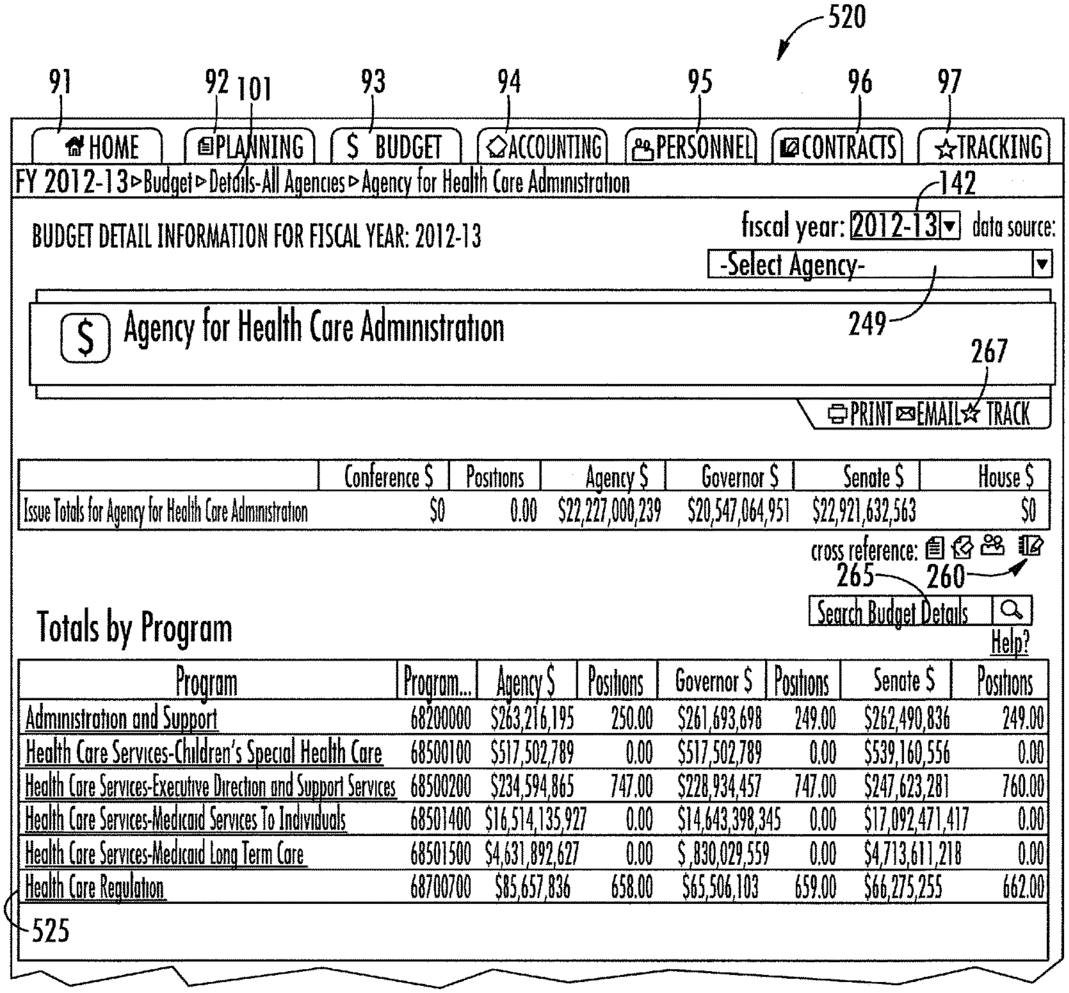

FIG. 33

| | 91 | 92 | 93 | 94 | 95 | 96 | 97 |
|---|---|---|---|---|---|---|---|
| | HOME | PLANNING | $ BUDGET | ACCOUNTING | PERSONNEL | CONTRACTS | ☆TRACKING |

530

FY 2012-13▷Budget▷Details-All Agencies▷Agency for Health Care Administration▷Issue List BUDGET DETAIL INFORMATION FOR FISCAL YEAR: 2012-13     fiscal year: [2012-13▼] data source:
                                                       [-Select Agency-          ▼]

[ $ ]  Program: Health Care Regulation- Health Care Regulation                    267

🖶 PRINT ✉ EMAIL ☆ TRACK

| Issue Type | Conference $ | Positions | Agency $ | Governor $ | Senate $ | House $ |
|---|---|---|---|---|---|---|
| Base Budget | $0 | 0.00 | $65,657,836 | $65,033,794 | $65,089,236 | $0 |
| New Issues | $0 | 0.00 | $472,309 | $472,309 | $1,176,019 | $0 |
| Total | $0 | 0.00 | $65,657,836 | $65,506,103 | $66,275,255 | $0 |

cross reference: 📄 ⊘ 👥 📝
265    260

Totals by Issue                          [Search Budget Details 🔍]
                                             Help?

Base Budget | New Issues | Capital Outlay

| Issue | Issue Code | Agency $ | Positions | Governor $ | Positions | Senate $ | Positions |
|---|---|---|---|---|---|---|---|
| ⊞ESTIMATED EXPENDITURES (4) | | | | | | | |
| | | $49,738,530 | 616.00 | $49,738,530 | 616.00 | $49,738,530 | 616.00 |
| ⊞ADJUSTMENTS TO CURRENT YEAR ESTIMATED EXPENDITURES (3) | | | | | | | |
| | | $472,309 | 0.00 | $0 | 0.00 | $0 | 0.00 |
| ⊞INTRA-AGENCY REORGANIZATIONS (2) | | | | | | | |
| | | $14,560,345 | 42.00 | $14,563,839 | 42.00 | $14,563,839 | 42.00 |
| ⊞ESTIMATED | | | | | | | |

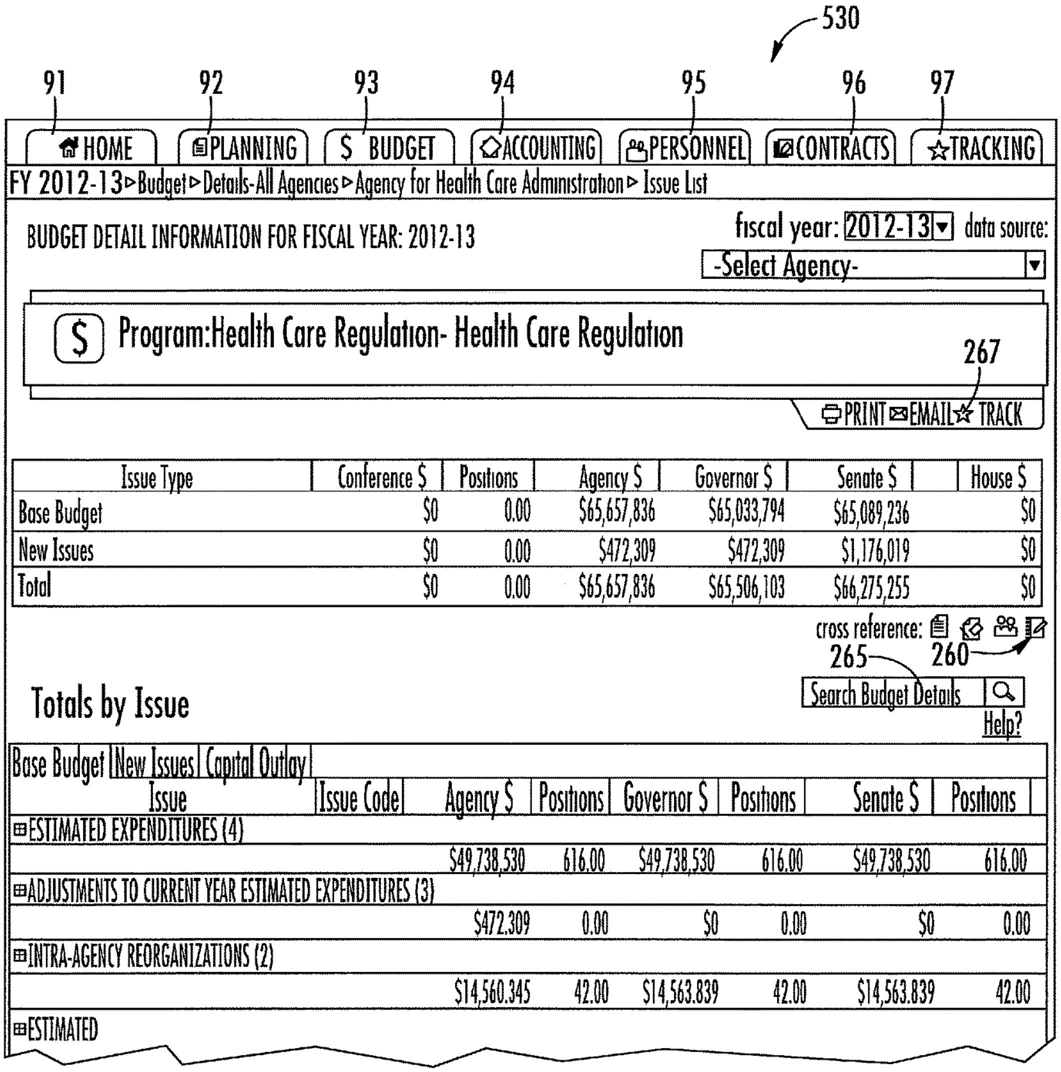

*FIG. 34*

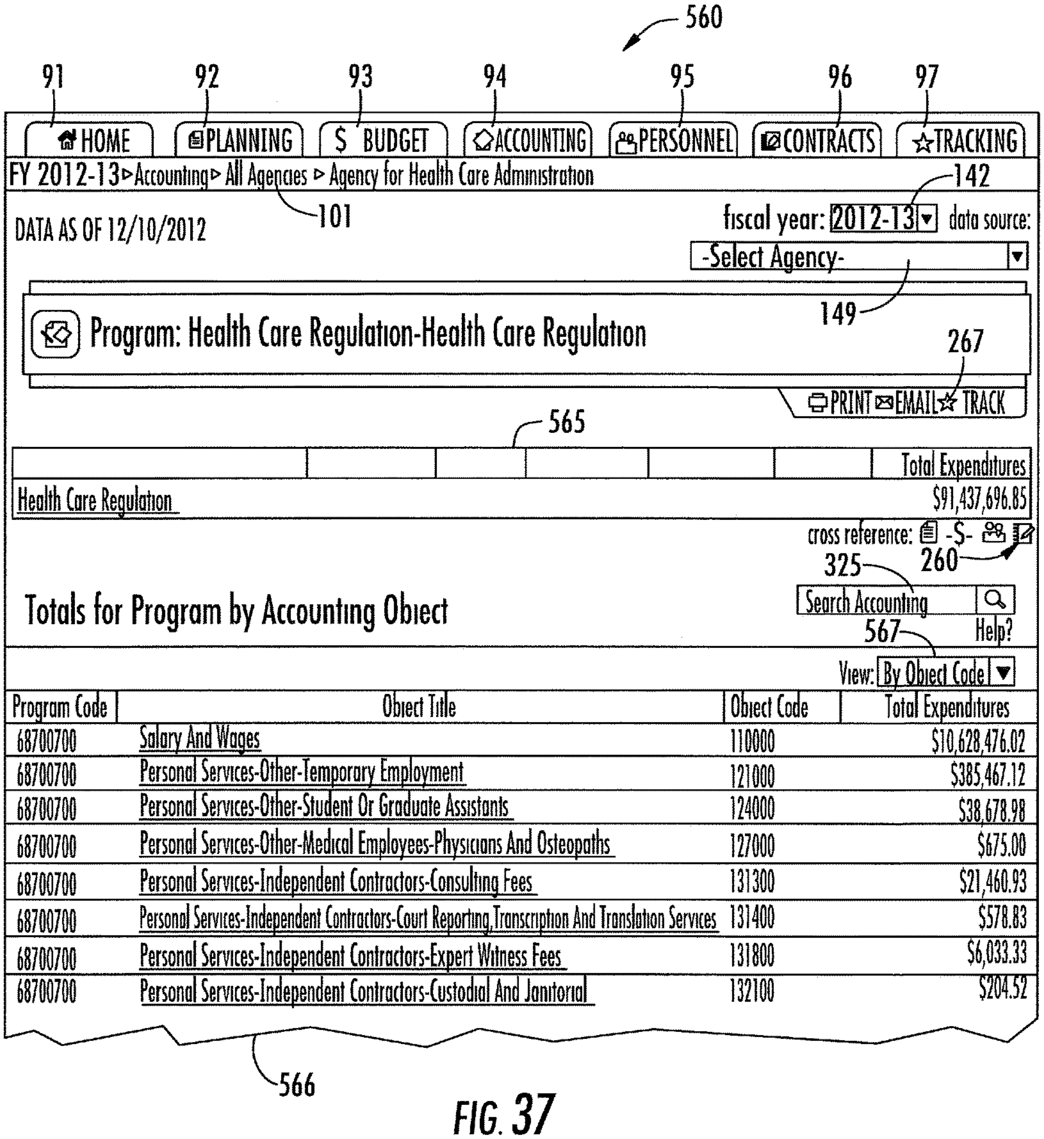

FIG. 37

| | | | | | | |
|---|---|---|---|---|---|---|
| 91 | 92 | 93 | 94 | 95 | 96 | 97 |
| 🏠 HOME | 📋 PLANNING | $ BUDGET | ⌂ ACCOUNTING | 👥 PERSONNEL | 📄 CONTRACTS | ☆ TRACKING |

FY 2012-13 ▷ Accounting ▷ All Agencies ▷ Agency for Health Care Administration — 142

DATA AS OF 12/10/2012 — 101 fiscal year: [2012-13 ▼] data source:
[-Select Agency- ▼]

[📧] Program: Health Care Regulation-Health Care Regulation — 149  267

🖨 PRINT ✉ EMAIL ☆ TRACK

— 565

| | | | | | | Total Expenditures |
|---|---|---|---|---|---|---|
| Health Care Regulation | | | | | | $91,437,696.85 |

cross reference: 📄 -$- 👥 📝
325   260

Totals for Program by Accounting Object

Search Accounting  🔍
567   Help?

View: [By Object Code ▼]

| Program Code | Object Title | Object Code | Total Expenditures |
|---|---|---|---|
| 68700700 | Salary And Wages | 110000 | $10,628,476.02 |
| 68700700 | Personal Services-Other-Temporary Employment | 121000 | $385,467.12 |
| 68700700 | Personal Services-Other-Student Or Graduate Assistants | 124000 | $38,678.98 |
| 68700700 | Personal Services-Other-Medical Employees-Physicians And Osteopaths | 127000 | $675.00 |
| 68700700 | Personal Services-Independent Contractors-Consulting Fees | 131300 | $21,460.93 |
| 68700700 | Personal Services-Independent Contractors-Court Reporting,Transcription And Translation Services | 131400 | $578.83 |
| 68700700 | Personal Services-Independent Contractors-Expert Witness Fees | 131800 | $6,033.33 |
| 68700700 | Personal Services-Independent Contractors-Custodial And Janitorial | 132100 | $204.52 |

— 566

| | | | | | | | |
|---|---|---|---|---|---|---|---|
|  | 91 | 92 | 93 | 94 | 95 | 96 | 97 |

570

| 🏠 HOME | 📖 PLANNING | $ BUDGET | ⌂ ACCOUNTING | 👥 PERSONNEL | 📇 CONTRACTS | ☆ TRACKING |

FY 2012-13 ▷ Accounting ▷ All Agencies ▷ Agency for Health Care Administration — 142

DATA AS OF 12/10/2012 — 101        fiscal year: [2012-13 ▼]   data source:
                                    [-Select Agency-          ▼]

| 📧 Program: Health Care Regulation-Health Care Regulation | 149 | 267 |

🖶 PRINT ✉ EMAIL ☆ TRACK

| Expenditure Type | Total Expenditures |
|---|---|
| OPERATIONS | $91,437,696.85 |
| FIXED CAPITAL OUTLAY | $0.00 |
| TOTAL | $91,437,696.85 |

cross reference: 📄 -$- 👥 📝
575 — 260

Totals for Program by Vendor        Search Payments 🔍
                                    576 — Help?

View: [By Vendor ▼]

| Vendor | Number of Payments | Total Amount |
|---|---|---|
| AGENCY FOR HEALTH CARE ADMIN | 23 | $69,944,264.68 |
| STATE EMPLOYEES | 313 | $15,364,994.78 |
| PRAEDIUM II ETP LLC | 7 | $1,889,915.20 |
| HARRIS CORPORATION | 4 | $1,088,012.00 |

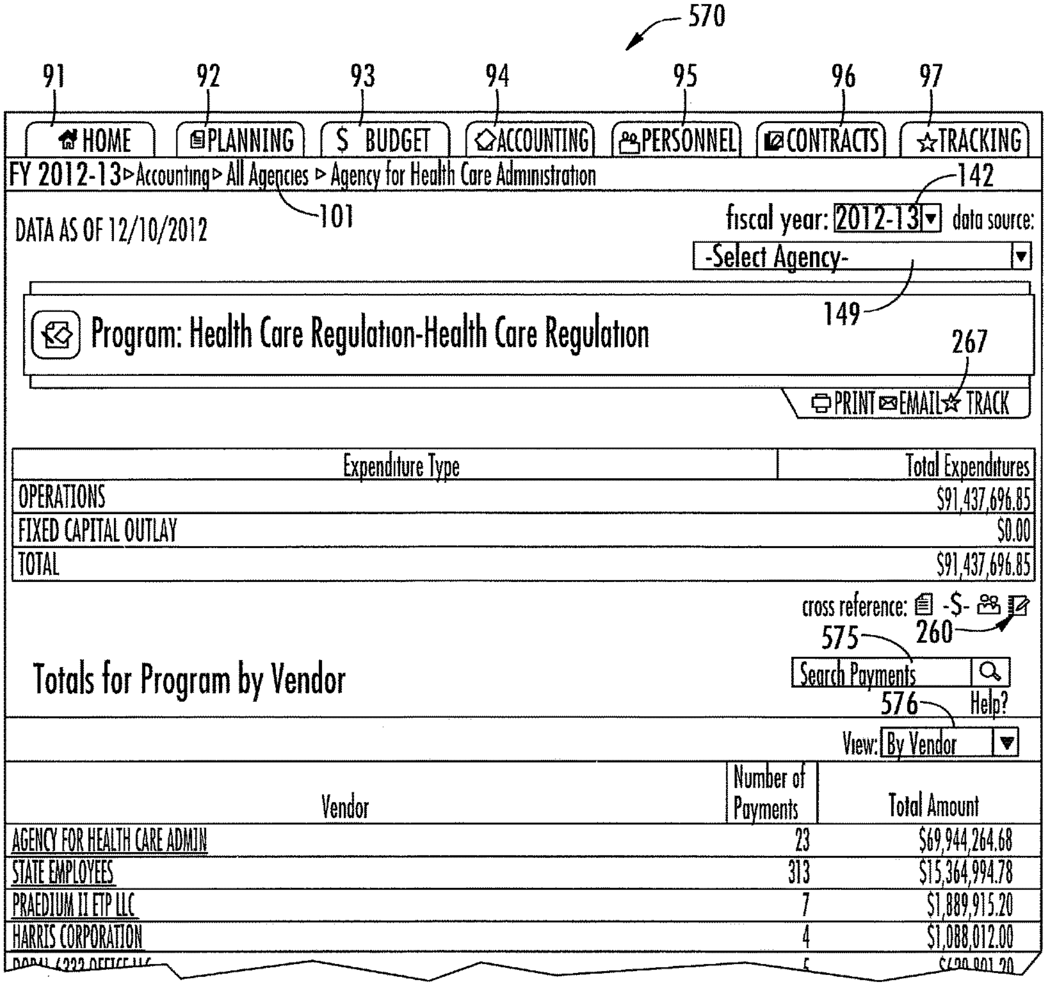

*FIG. 38*

| | Positions | Salary + Benefits | Salary | Benefits |
|---|---|---|---|---|
| SALARIED | 659.00 | $37,580,011 | $27,991,428 | $9,568,583 |
|   Filled | 607.00 | $35,054,589 | $26,200,938 | $8,853,651 |
|   Vacant | 52.00 | $2,505,422 | $1,790,490 | $714,932 |
| OPS | 28.00 | $1,102,090 | $1,102,090 | $0 |
| TOTALS | 687.00 | $38,662,101 | $29,093,518 | $9,568,583 |

AGENCY FOR HEALTH CARE ADMINISTRATION- HEALTH CARE REGULATION CROSS REFERENCE
PLANNING | $ BUDGET | ACCOUNTING | PERSONNEL | CONTRACTS    FISCAL YEAR: 2012-13

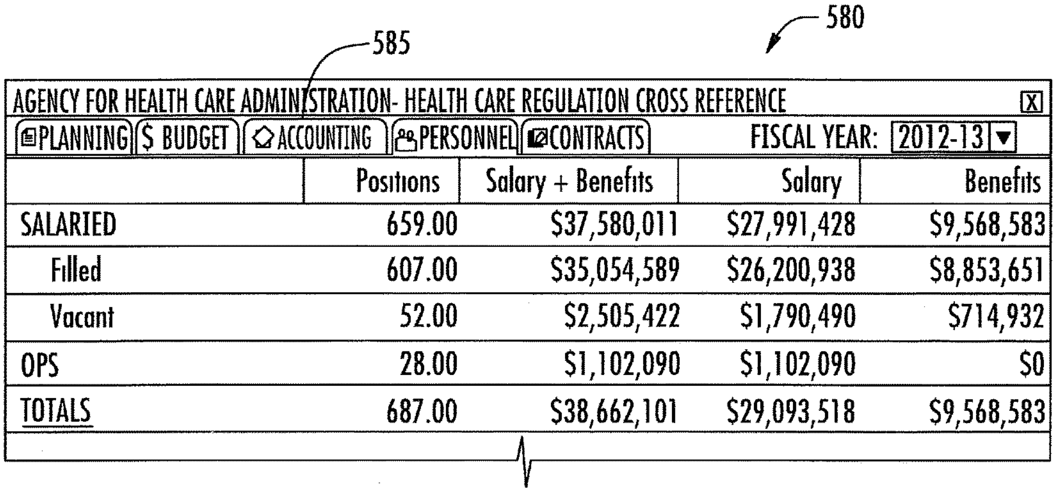

FIG. 39

Agency for Health Care Administration
SALARIES & BENEFITS (REGULAR & OPS): $100,353,599    267

PRINT ☒ EMAIL ☆ TRACK

| | Positions | Salary + Benefits | Salary | Benefits |
|---|---|---|---|---|
| SALARIED | 1,657.00 | $95,244,303 | $70,915,441 | $24,328,862 |
|   Filled | 1,539.00 | $69,168,197 | $66,521,322 | $22,646,875 |
|   Vacant | 118.00 | $6,076,106 | $4,394,119 | $1,681,987 |
| OPS | 163.50 | $5,109,296 | $5,109,296 | $0 |
| AGENCY TOTALS | 1,820.50 | $100,353,599 | $76,024,737 | $24,328,862 |

cross reference:

Totals by Program    Filter search by positions: All Positions    Search Personnel    Help?

| Program | Program C... | Regular Positions | Regular Salary + Benefits | Regular Salary | Regular Benefits | Vacant Positions | OPS Positions |
|---|---|---|---|---|---|---|---|
| Administration and Support | 68200000 | 249.00 | $15,485,387 | $11,619,101 | $3,866,286 | 15.00 | 18.00 |
| Health Care Services-Executive Direction And Support Services | 68500200 | 749.00 | $42,198,905 | $31,304,912 | $10,893,993 | 51.00 | 117.50 |
| Health Care Regulation-Health Care Regulation | 68700700 | 659.00 | $37,580,011 | $27,991,428 | $8,568,583 | 52.00 | 28.00 |

"OPS costs for a fiscal year are calculated using the following method: OPS HOURLY RATE" AVERAGE MONTHLY HOURS x 12 Months. OPS data comes from the FLAIR Accounting System, which represents actual state expenditures.

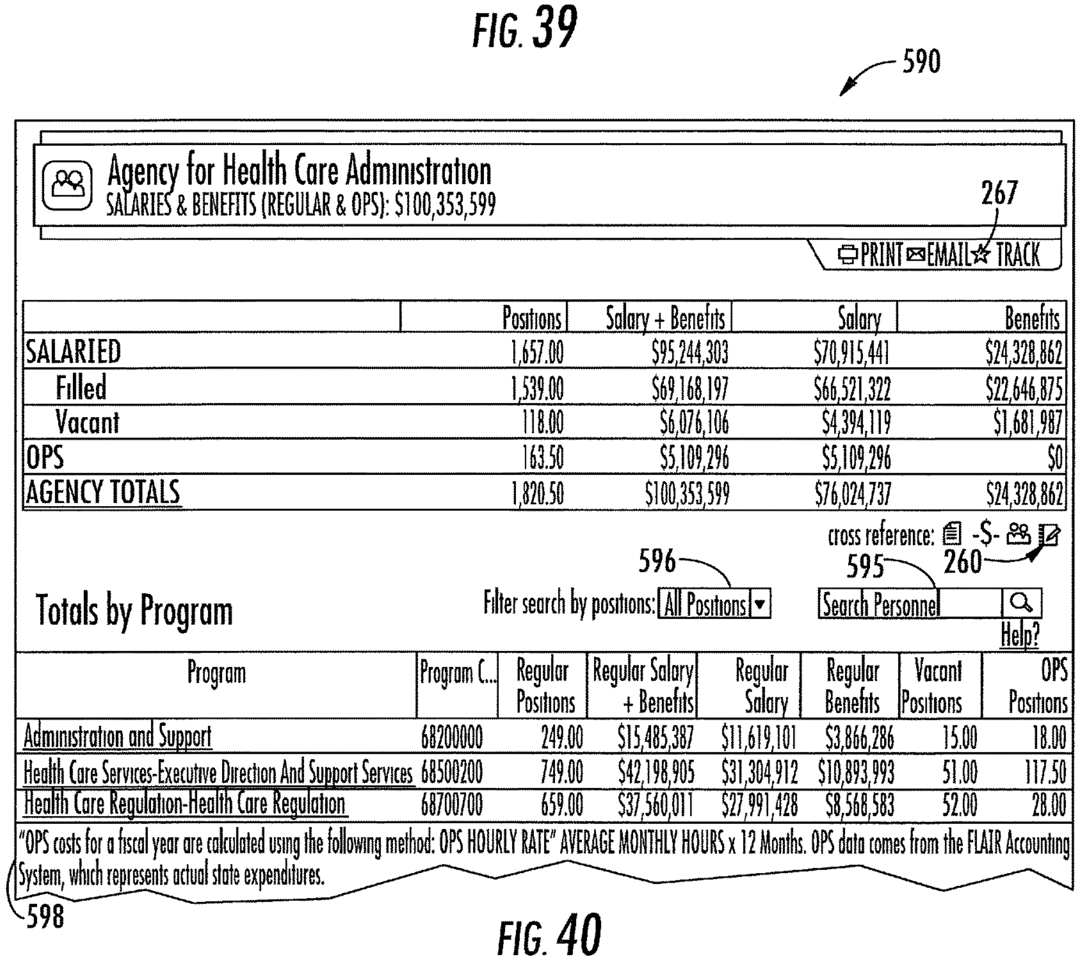

FIG. 40

```
       91        92         93        94         95          96         97
   ┌─HOME──┬─PLANNING─┬─$ BUDGET─┬─ACCOUNTING─┬─PERSONNEL─┬─CONTRACTS─┬─TRACKING─┐
```
FY 2012-13 ▷ Personnel ▷ All Agencies ▷ Agency for Health Care Administration — 142

DATA AS OF 12/10/2012                              fiscal year: [2012-13 ▼]  data source:
                                                   [-Select Agency-        ▼]

[👥] Health Care Regulation                                       149
                                                                            267

⏻PRINT ✉EMAIL ☆TRACK
                                                                       605

|  | Positions | Salary + Benefits | Salary | Benefits |
|---|---|---|---|---|
| SALARIED | 659.00 | $37,560,011 | $27,991,428 | $9,568,583 |
| Filled | 607.00 | $35,054,589 | $26,200,938 | $8,853,651 |
| Vacant | 52.00 | $2,505,422 | $1,790,490 | $714,932 |
| OPS | 28.00 | $1,102,090 | $1,102,090 | $0 |
| TOTALS | 687.00 | $38,662,101 | $29,093,516 | $9,568,583 |

cross reference: 📄 -$- 📎 📝
                           260

Details by Program    Filter search by positions: [All Positions ▼]  [Search Personnel  🔍]
                                          596              595                    Help?

| Position Title | Position Number | Salary+Benefits | Salary $ | Benefit Cost | Positions (FTE) | County | OPS | Vacant Positions |
|---|---|---|---|---|---|---|---|---|
| OPS SENIOR PHYSICIAN | 900043 | $2,145 | $2,145 | $0 | 1 | Leon | Y | 0 |
| OPS SENIOR CLERK | 900084 | $3,412 | $3,412 | $0 | 1 | Leon | Y | 0 |
| OPS ADMINISTRATIVE SECRETARY | 900035 | $7,873 | $7,873 | $0 | 1 | Lee | Y | 0 |
| OPS ADMINISTRATIVE SECRETARY | 900171 | $8,779 | $8,779 | $0 | 1 | Orange | Y | 0 |
| OPS REGULATORY SPECIALIST I | 900210 | $11,363 | $11,363 | $0 | 1 | Alachua | Y | 0 |

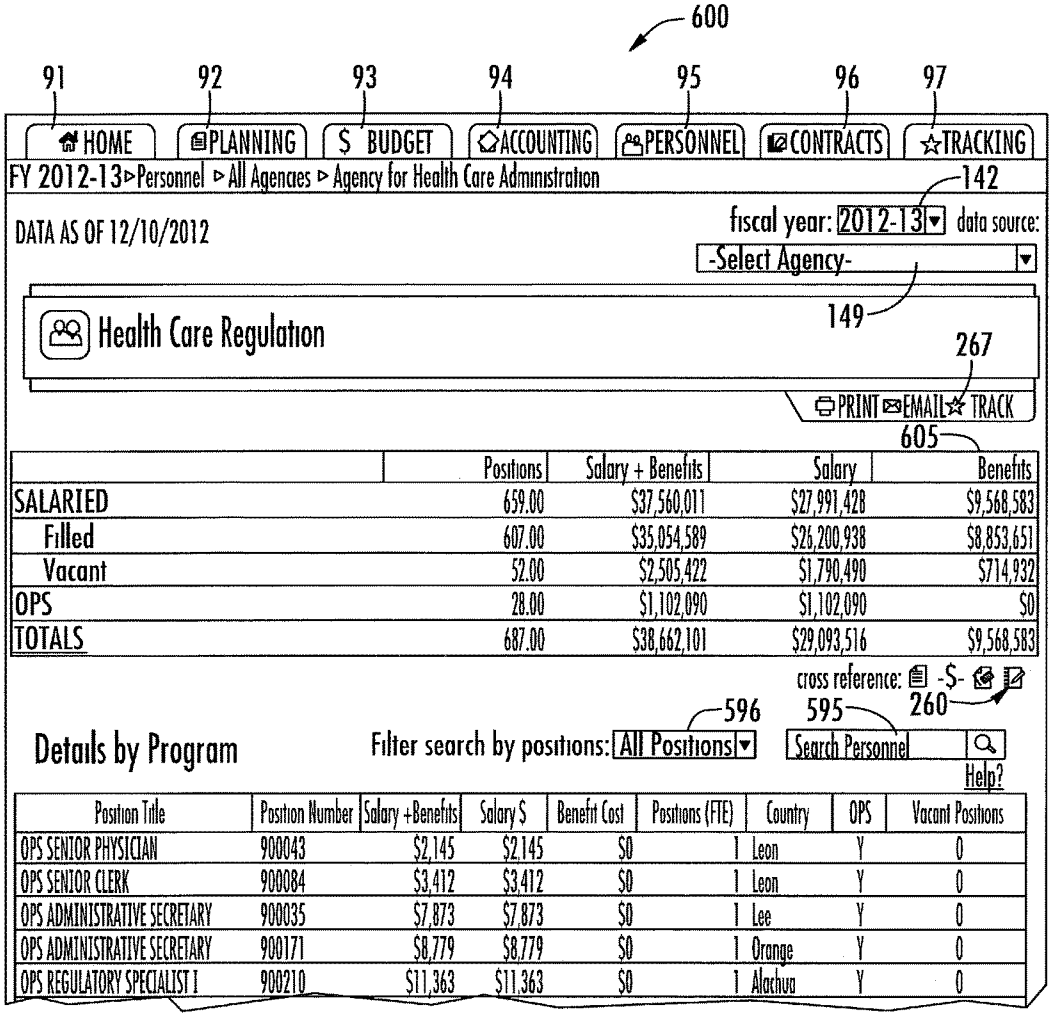

| AGENCY FOR HEALTH CARE ADMINISTRATION- HEALTH CARE REGULATION CROSS REFERENCE | | [X] |
|---|---|---|
| 🖹PLANNING \| $ BUDGET \| ⌂ACCOUNTING \| 👥PERSONNEL \| 📄CONTRACTS | FISCAL YEAR: 2012-13 ▼ | |
| | Number of Contracts | Annual Amount |
| Health Care Regulation | 3 | $837,784.39 |

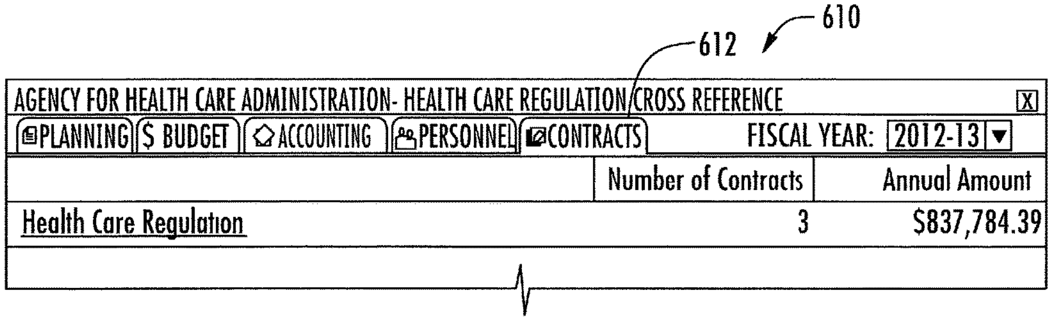

| 🏠HOME | 🖹PLANNING | $ BUDGET | ⌂ACCOUNTING | 👥PERSONNEL | 📄CONTRACTS | ★TRACKING |
|---|---|---|---|---|---|---|

FY 2012-13 ▷ Contracts ▷ All Agencies ▷ Agency for Health Care Administration    —142

DATA AS OF 12/10/2012                    fiscal year: 2012-13 ▼  data source:
                                          -Select Agency-            ▼

📝 Agency for Health Care Administration             149—
                                                                          267
                                                    🖨PRINT ✉EMAIL ★TRACK
                                                              605—

| | Number of Contracts | Annual Amount |
|---|---|---|
| Agency for Health Care Administration | 142 | $3,648,171,069.80 |

cross reference: 🖹 -$- 📄 👥
342—   260

Contracts by Program                    Search Contracts  🔍
                                                           Help?

| Program | Program Cod... | Number of Contracts | Annual Amount |
|---|---|---|---|
| Agency For Health Care Administration | 68000000 | 2 | $6,083,125.00 |
| Administration and Support | 68200000 | 5 | $10,111,242.80 |
| Children's Special Health Care | 68500100 | 5 | $323,852,489.00 |
| Executive Direction and Support Services | 68500200 | 58 | $153,383,124.71 |
| Medicaid Services To Individuals | 68501400 | 69 | $3,153,903,303.90 |
| Health Care Regulation | 68700700 | 3 | $837,784.39 |

—621

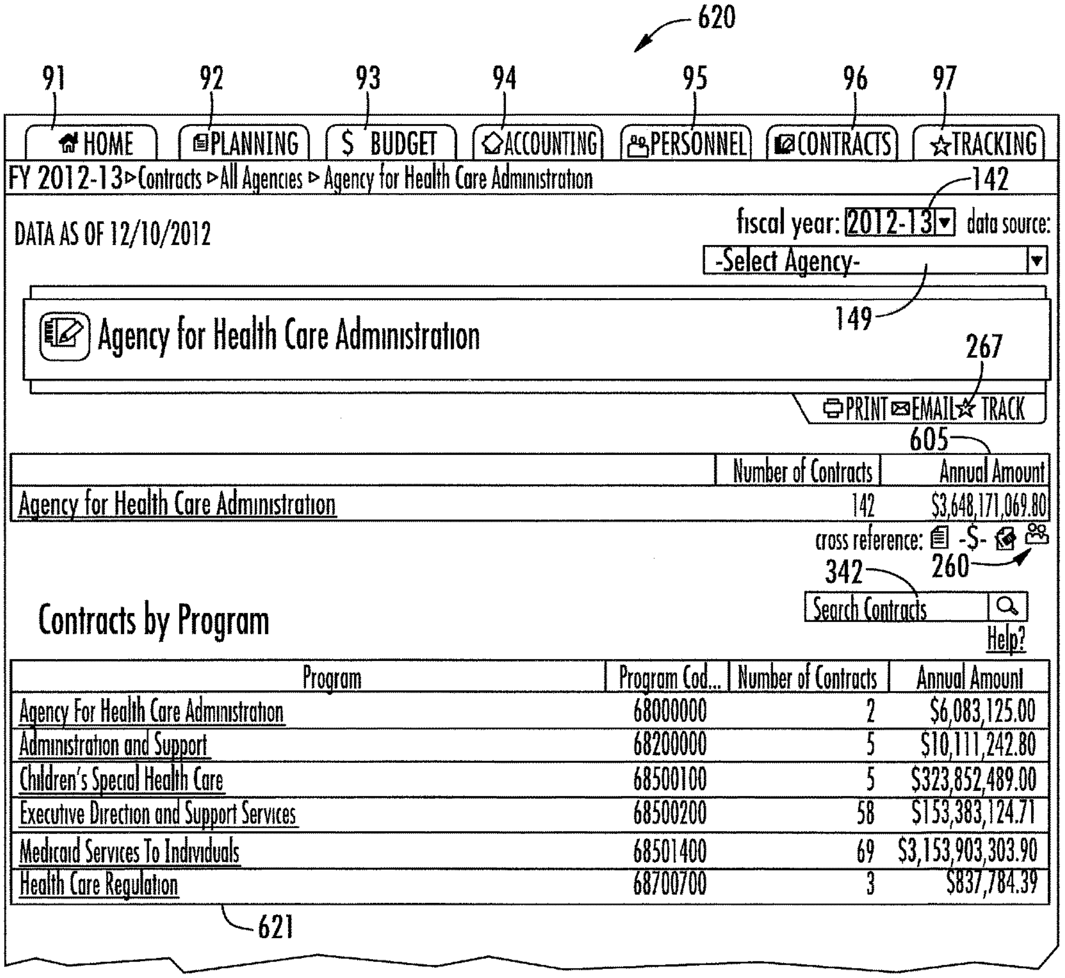

FIG. 43

BUDGET INFORMATION SYSTEM WITH CROSS-REFERENCE FEATURE AND RELATED METHODS

RELATED APPLICATIONS

This application is based upon prior filed provisional application Ser. No. 61/665,692 filed Jun. 28, 2012, the entire subject matter of which is incorporated herein by reference in its entirety.

FIELD OF THE INVENTION

The present invention relates to the field of processing a networked processing system, and, more particularly, to a system for remotely viewing the budgetary data and related methods.

BACKGROUND OF THE INVENTION

Government budgets are typically quite complex and extensive in scope. For example, the State of Florida has fiscal year 2013 budget of $70 billion spread across many agencies. Initially, when the budgets were first digitized, there was little standardization and little transparency. In other words, only those with an intimate understanding of the budget could distill anything more than generalities.

Eventually, accounting codes were standardized in the State of Florida Budget, which aided in the digitization across different agencies. Nevertheless, each agency maintained their budget system individually, leading to reduced interoperability. These budget systems were often housed on mainframes, with program files being difficult to access and manipulate. Another drawback to these individualized systems was that their use required extensive training and a background in the budget system. For elected officials, a staff was required to mine data as desired. Moreover, for a person outside the government, it would be virtually impossible to obtain such data in a desired form.

In the State of Florida system, operational systems data for state personnel, accounting, budgeting, planning, and contracts are housed in separate mainframe computers that are not linked together and are incompatible. With recent laws, many governmental entities are now obligated to provide public access to many of these same budget systems. Moreover, this same access may need to be provided in an online interface that may be navigated by the public.

SUMMARY OF THE INVENTION

In view of the foregoing background, it is therefore an object of the present invention to provide a budget information device that provides efficient and robust access to government financial databases.

This and other objects, features, and advantages in accordance with the present invention are provided by a budget information device comprising a memory and a processor cooperating with the memory for importing and storing a plurality of different financial databases into the memory, each different financial database comprising numerical data and textual identifiers (e.g. monetary cost and item description). The memory and a processor may also be for processing the numerical data and textual identifiers from the plurality of different financial databases, and providing a graphical user interface (GUI) to a user, the GUI (e.g. web page based user interface) comprising a plurality of views for respectively accessing the numerical data and textual identifiers for each of the plurality of different financial databases, each view comprising a cross-reference feature for accessing numerical data and textual identifiers associated to numerical data and textual identifiers in a current view. Advantageously, the budget information device enhances the transparency of the financial data therein for the user.

In particular, the cross-reference feature may provide a pop-up window comprising a plurality of tabs for accessing the numerical data and textual identifiers in respective different financial databases associated to the numerical data and textual identifiers in the current view. Each view may comprise a menu comprising a plurality of fiscal year indicators for providing the numerical data and textual identifiers for each fiscal year.

In some embodiments, each view may comprise a home screen providing a general overview of the numerical data and textual identifiers for the corresponding different financial database. For example, the plurality of different financial databases may comprise a planning database, a budget database, an accounting database, a personnel database, and a contracts database. Also, the view for the budget database may comprise a plurality of tabs for accessing a plurality of versions of a budget.

The GUI may comprise a plurality of tabs for selecting the plurality of views for accessing the numerical data and textual identifiers for the plurality of different financial databases. Moreover, the GUI may provide a tracking view comprising numerical data and textual identifiers for a plurality of user-selected items, and the processor may update the numerical data and textual identifiers for the plurality of user-selected items from the plurality of different financial databases.

Another aspect is directed to a budget information system comprising a plurality of different financial databases, and a budget information device remote to the plurality of different financial databases and comprising a memory and a processor cooperating with the memory. The processor and the memory may be for importing and storing the plurality of different financial databases into the memory, each different financial database comprising numerical data and textual identifiers, processing the numerical data and textual identifiers from the plurality of different financial databases, and providing a GUI to a user. The GUI may comprise a plurality of views for respectively accessing the numerical data and textual identifiers for each of the plurality of different financial databases. Each view may comprise a cross-reference feature for accessing numerical data and textual identifiers associated to numerical data and textual identifiers in a current view.

Another aspect is directed to a method for displaying budget information from a plurality of different financial databases. The method may comprise using a memory and a processor cooperating with the memory for importing and storing the plurality of different financial databases into the memory, each different financial database comprising numerical data and textual identifiers, processing the numerical data and textual identifiers from the plurality of different financial databases, and providing a GUI to a user. The GUI may comprise a plurality of views for respectively accessing the numerical data and textual identifiers for each of the plurality of different financial databases. Each view may comprise a cross-reference feature for accessing numerical data and textual identifiers associated to numerical data and textual identifiers in a current view.

BRIEF DESCRIPTION OF THE DRAWINGS

FIGS. 2-24 are screenshots from the GUI provided by the budget information system of FIG. 1.

FIGS. 28-44 are additional screenshots from the GUI provided by the budget information system of FIG. 1.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
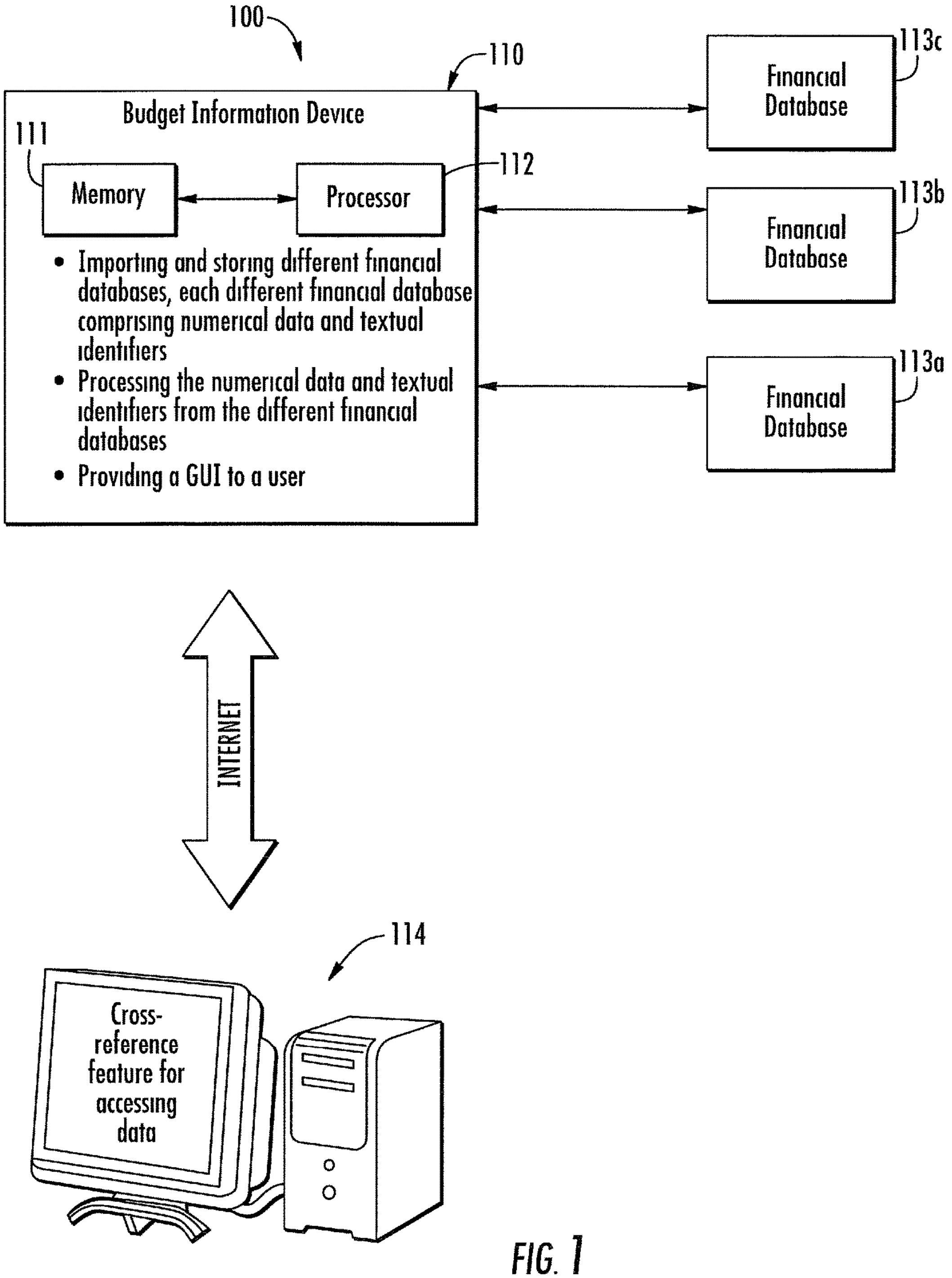
FIG. 1 is a schematic diagram of an embodiment of a budget information system, according to the present invention.

Referring now to FIG. 1, a budget information system 100 according to the present invention is now described. The budget information system 100 illustratively includes a plurality of different financial databases 113*a*-113*c*, and a budget information device 110 remote to the plurality of different financial databases and comprising a memory 111 and a processor 112 cooperating with the memory. For example, the budget information device 110 may comprise a web-based server comprising a relational database server, such as a Microsoft SQL Server, as available from the Microsoft Corporation of Redmond, Wash.

For example, the plurality of different financial databases 113*a*-113*c* may comprise a planning database, a budget database, an accounting database, a personnel database, and a contracts database. In some embodiments (FIGS. 2-44), these different financial databases 113*a*-113*c* may be related to governmental entities, such as the State of Florida.

The processor 112 and the memory 111 illustratively import and store the plurality of different financial databases 113*a*-113*c* into the memory. In particular, each different financial database 113*a*-113*c* comprises numerical data and textual identifiers, and this data is stored in the memory 111. The numerical data and textual identifiers may comprise monetary cost and item description. The processor 112 and the memory 111 may import and store the plurality of different financial databases 113*a*-113*c* into the memory using the approach disclosed in U.S. Pat. No. 6,687,713 to Mattson et al., also assigned to the present application's assignee, the contents of which are incorporated by reference in their entirety.

The processor 112 and the memory 111 illustratively process the numerical data and textual identifiers from the plurality of different financial databases 113*a*-113*c*. In particular, the budget information device 110 is networked (e.g. local networking or Internet based) with the different financial database 113*a*-113*c* and retrieves the numerical data and textual identifiers therefrom. Since the numerical data and textual identifiers may change, the budget information device 110 may periodically pull this data from the different financial databases 113*a*-113*c*, such as on a weekly basis. The budget information device 110 may import the entirety of the different financial databases 113*a*-113*c* initially and thereafter only pull delta (i.e. difference) data, thereby reducing traffic load.

The budget information system 100 illustratively includes a computing device 114 (e.g. a web enabled device, such as the illustrated personal computing device, a mobile cellular device, a tablet computing device for use by a user). The processor 112 and the memory 111 illustratively provide a GUI to a user on the computing device 114. The computing device 114 would comprise a display, and a processor cooperating therewith to render the GUI on the display. For example, the GUI may comprise a HyperText Markup Language (HTML) GUI, which can be readily viewed on a great variety of devices.

Referring now additionally to FIGS. 2-9, the GUI is now described in detail. In this exemplary illustrated embodiment, the GUI provides data related to the State of Florida, but is can be readily appreciated that the herein described system can be used for many other financial databases (e.g. National Government Entities, large corporate entities, etc.). The GUI comprises a plurality of views 120, 140, 160, 180, 200, 220, 240 for respectively accessing the numerical data and textual identifiers for each of the plurality of different financial databases 113*a*-113*c*. Each view 120, 140, 160, 180, 200, 220, 240 defines a module for the respective different financial database 113*a*-113*c*. The module may comprise a plurality of levels as the user navigates the data of the associated financial database 113*a*-113*c*. Each level in the module represents a corresponding tier of data (i.e. tiers corresponding to levels of the entity, e.g. department, agency, office, division representing levels) in the respective different financial database 113*a*-113*c*. In the illustrated embodiment, each view 120, 140, 160, 180, 200, 220, 240 comprises a home screen providing a general overview of the numerical data and textual identifiers for the corresponding different financial database 113*a*-113*c*.

Each view 120, 140, 160, 180, 200, 220, 240 comprises a cross-reference feature 260 for accessing numerical data and textual identifiers associated to numerical data and textual identifiers in a current view. In other words, whatever data being viewed by the user in the current view can be readily referenced to related data in other modules. For example, using the State of Florida embodiment, if the user is viewing the budget data for a particular program, the user can easily in one click view the contracts executed for the same program, the planning data for the same program, the personnel associated to the program, and the accounting results for the same program.

In particular, the cross-reference feature 260 illustratively provides a pop-up window 300 comprising a plurality of tabs 302-306 for accessing the numerical data and textual identifiers in respective different financial databases 113*a*-113*c* associated to the numerical data and textual identifiers in the current view. Advantageously, the user can navigate the cross-referenced data across each module without leaving the current view. Each view may comprise a menu 142 comprising a plurality of fiscal year indicators for providing the numerical data and textual identifiers for each fiscal year.

Each view 120, 140, 160, 180, 200, 220, 240 of the GUI illustratively includes a plurality of tabs 91-97 for selecting the plurality of views for accessing the numerical data and textual identifiers for the plurality of different financial databases 113*a*-113*c*. These tabs 91-97 are global and accessible in every view 120, 140, 160, 180, 200, 220, 240 and level. Also, each view 120, 140, 160, 180, 200, 220, 240 of the GUI illustratively includes a global locator 101 for providing the user a quick reference to the current view's location in the database navigation. The global locator 101 provides the user with a module and tier of current location in the financial database 113*a*-113*c*.

In FIG. 2, the view 120 for the home page is shown. This view 120 illustratively includes a welcome message panel 723, and a data sources panel 121 providing a short description of each of the accessible different financial databases 113*a*-113*c*. Moreover, the data sources panel 121 provides duplicative links for selecting the plurality of views 120, 140, 160, 180, 200, 220, 240 for accessing the numerical data and textual identifiers for the plurality of different financial databases 113*a*-113*c*.

In FIG. 3, the view 140 for the planning financial database (planning module) is shown. This view 120 illustratively includes a welcome message panel 711, and a general overview panel 141 including general aggregate data for each major governmental division of the State of Florida. In the general overview panel 141, each section provides a link to the appropriate data in the planning database. Also, the view 140 illustratively includes a menu feature 142 for providing access to the numerical data and textual identifiers for varying fiscal years. This feature is advantageously included in some of the other views.

Figure 5:
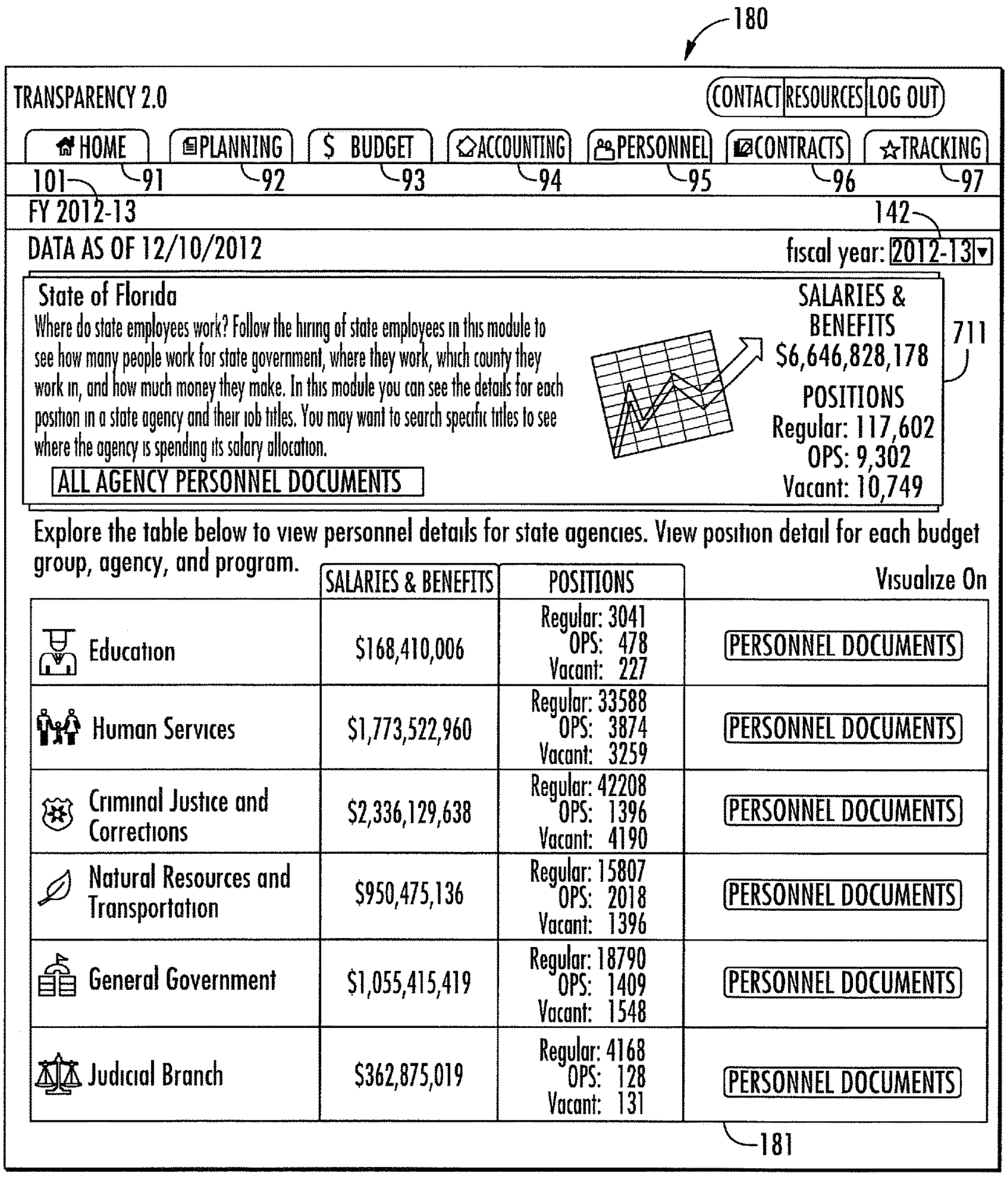

In FIG. 4, the view 160 for the planning financial database (module) is shown. This view 160 illustratively includes a welcome message panel 712, and a general overview panel 161 including aggregate expenditures for each major governmental division of the State of Florida. In FIG. 5, the view 180 for the personnel financial database (module) is shown. This view 180 illustratively includes a welcome message panel 713, and a general overview panel 181 including aggregate personnel expenditures, positions, and position vacancies for each major governmental division of the State of Florida.

In FIG. 6, the view 200 for the contracts financial database (module) is shown. This view 200 illustratively includes a welcome message panel 714, again providing some general contracts database information to the user. This view 200 illustratively includes a general overview panel 201 including aggregate contract expenditures, and the number of annual contracts for each major governmental division of the State of Florida.

Figure 7:
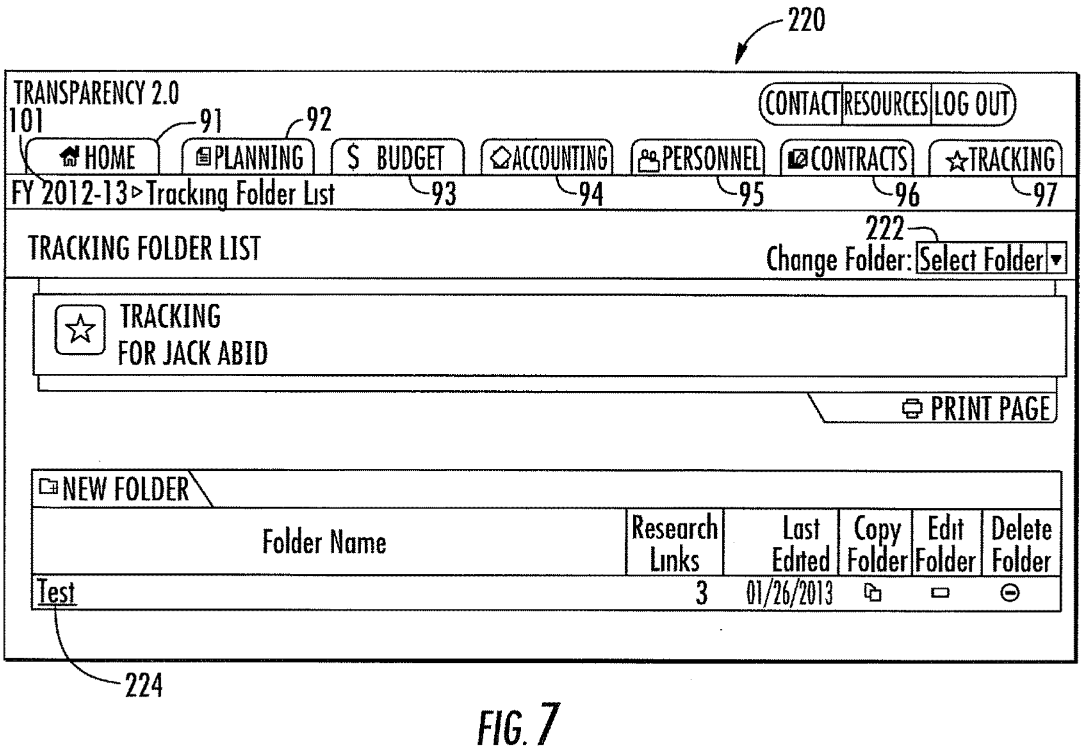
Figure 8:
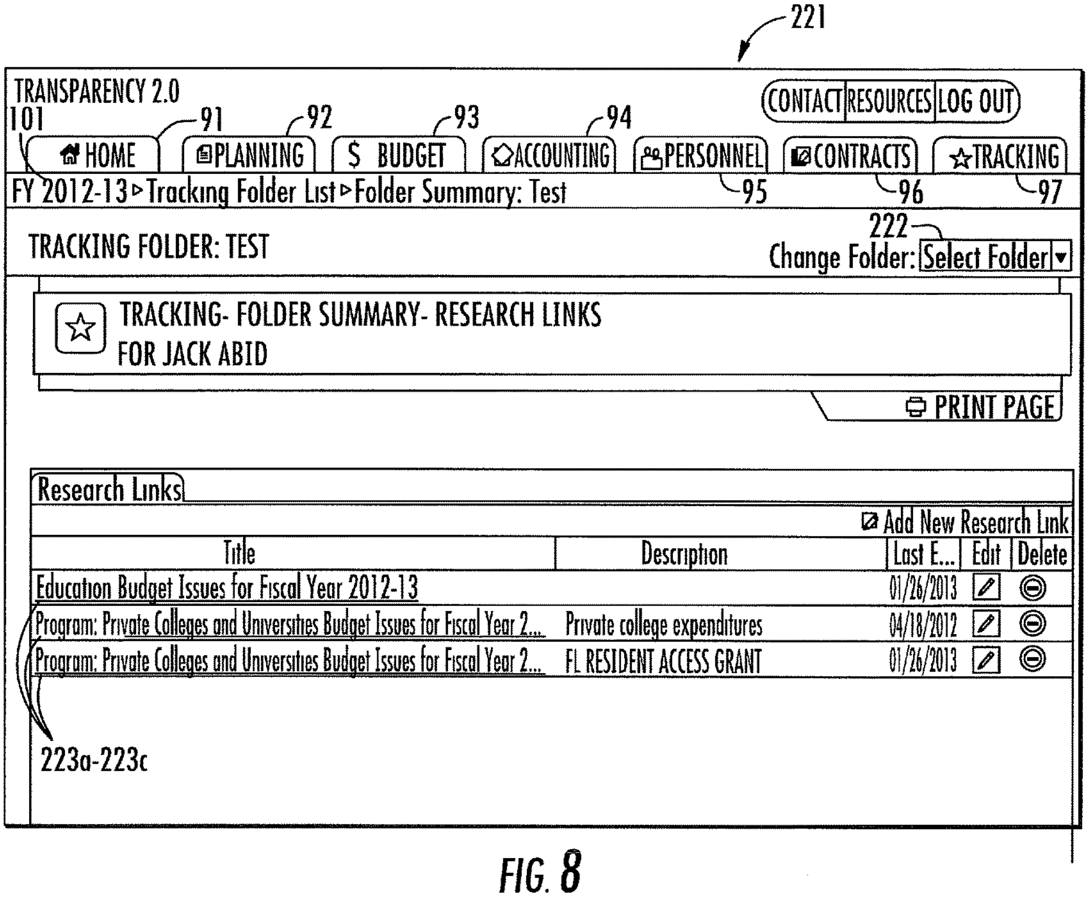

In FIGS. 7-8, the view 220 for the tracking feature (i.e. tracking view or tracking module) is shown. This view 220 illustratively includes numerical data and textual identifiers for a plurality of user-selected items. In particular, as the user explores the varying levels of the GUI and the modules therein, the user may find a particular item of interest. The user may utilize the tracking feature and "favorite" the item, which links the item to the tracking view 220. The processor 112 updates the numerical data and textual identifiers for the plurality of user-selected items from the plurality of different financial databases 113*a*-113*c*. The first level view 220 illustratively includes a list of user created folders 224. It should be appreciated that although only one folder is illustrated, the GUI is capable of providing many more. The view 220 also includes a menu feature 222 for selecting the user created folders. Of course, the user may also directly select the folder 224. Once the user selects the folder 224, the next view 221 (lower level view) provides a listing of the plurality of user-selected items 223*a*-223*c* within the folder 224. Advantageously, if the user is interested in a particular program associated with local schools, the user may track this program and monitor each stage of the program, i.e. budget appropriations, contracts executed on its behalf, personnel working on it, actual accounting for the program, and planning documents for the program.

Figure 9:
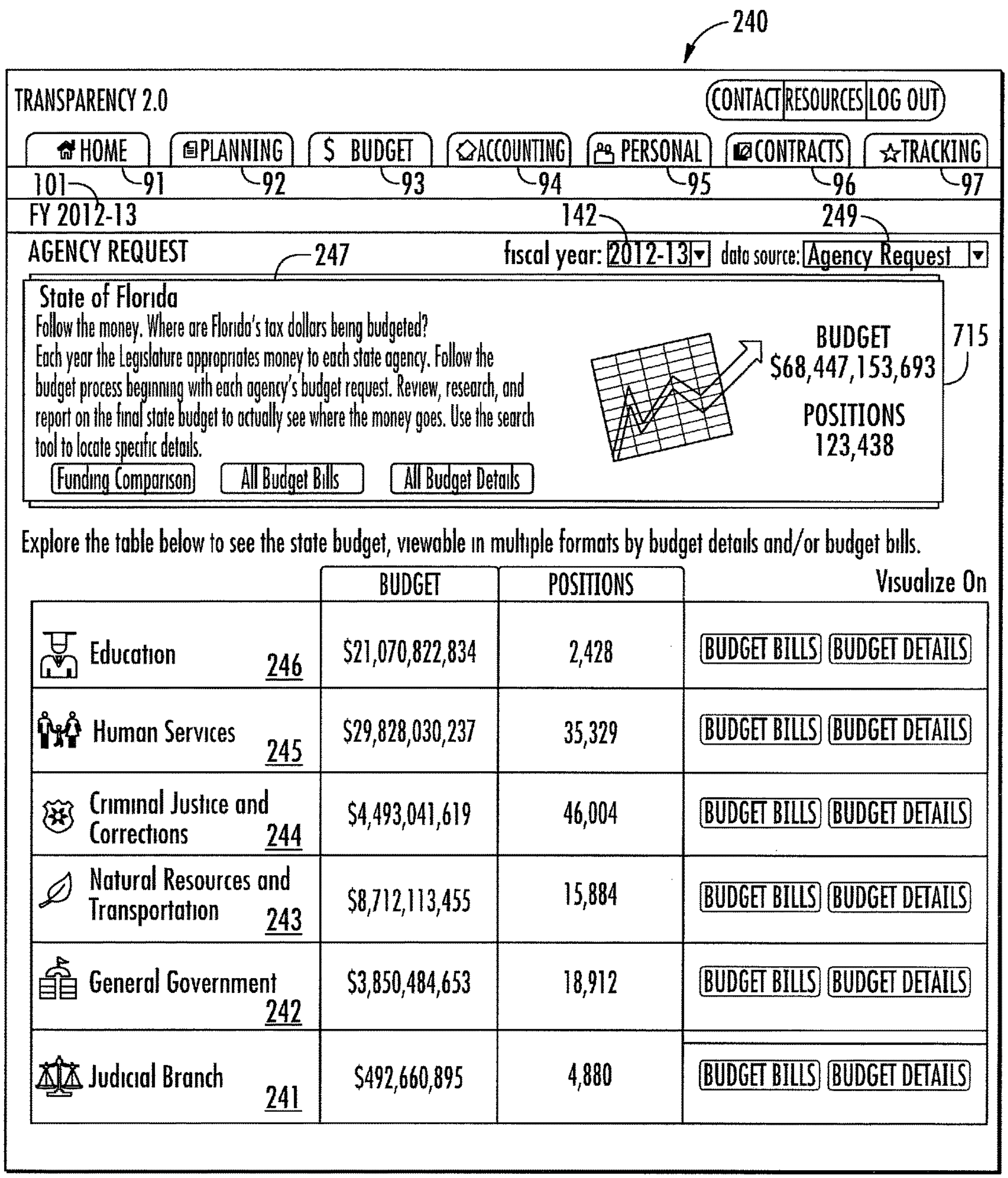

In FIGS. 9-10, the view 240 for the budget financial database (module) is shown. In the following, several levels of the budget module are now described for exemplary purposes. Many of the features disclosed for the budget module may be applied to the other modules disclosed herein. This view 240 illustratively includes a welcome message panel 715 providing conglomerate budget data and direct links to popular budget data items, illustratively funding comparisons, budget bills, and all budget details. This view 240 illustratively includes a general overview panel 241 including aggregate budget amounts, and positions for each major governmental division 241-246 of the State of Florida. As noted above, this view 240 also includes the menu feature 142 for selecting the data for different fiscal years. Additionally, this view 249 illustratively includes a menu feature 249 for selecting varying versions of the budget data in the current view. In the illustrated embodiment, the versions include an agency requested version, a Governor's recommendation version, and a Senate version.

As in other views, each of the major governmental division 241-246 in the general overview panel 241 may be selected for navigating the associated data. After selection of the education division 246, the GUI provides a second level view 250 of the education budget information. This view 250 includes the same global menu features 142, 249, and a panel 251 including the education budget information. The education budget information illustratively includes a list of programs 252*a*-252*n*. The view 250 also includes a search feature 265 for providing the user quick access to specific budget data. Positively, at any point, the user may key word search the current view's module for the relevant data.

Figure 11:
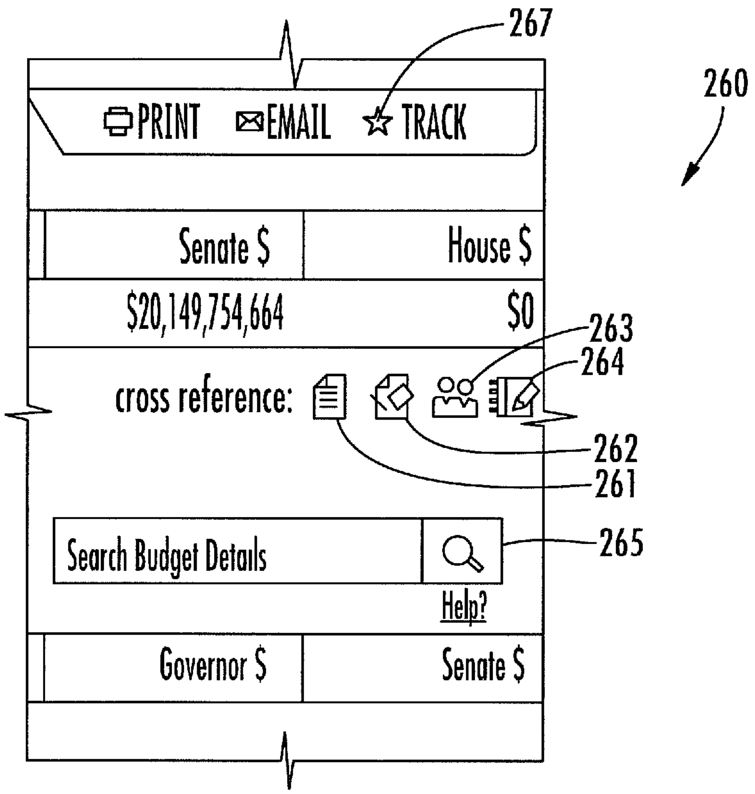

Referring now additionally to FIG. 11, this view 250 illustratively includes the cross-reference feature 260 for accessing numerical data and textual identifiers associated to numerical data and textual identifiers in a current view, and the aforementioned tracking feature 267. In particular, the cross-reference feature 260 illustratively includes links (icons) 261-264 for each of the other different financial databases 113*a*-113*c* not currently being viewed. In this illustrated example, the links include a planning link 261, an accounting link 262, a personnel link 263, and a contracts link 264. Helpfully, the programs and data in the current view can quickly be related to associated data in the other different financial databases 113*a*-113*c*.

In FIG. 12, the GUI provides a third level view 270 of the education budget information. In particular, this view 250 is provided after the selection of the "education-fixed capital outlay" program link in the upper level view 250. This view 270 illustratively includes a panel 276 comprising a list of issues 275*a*-275*d* related to the "education-fixed capital outlay," and the related budget data (i.e. issue code, conference committee amount, positions, agency request amount, Governor's amount, and the Senate amount). In addition, the panel 276 illustratively includes a plurality of tabs 271-273 for accessing base budget data, and new issues.

In FIG. 13, the GUI provides a fourth level view 280 of the education budget information. In particular, this view 280 is provided after the selection of the "debt service" link in the upper level view 270. Also, this view 280 illustratively includes a panel 281 providing data relating to the "debt service." Advantageously, this panel 281 illustratively includes a plurality of tabs 283-289 for accessing a plurality of versions of a budget and narratives relating to the item.

Figure 16:
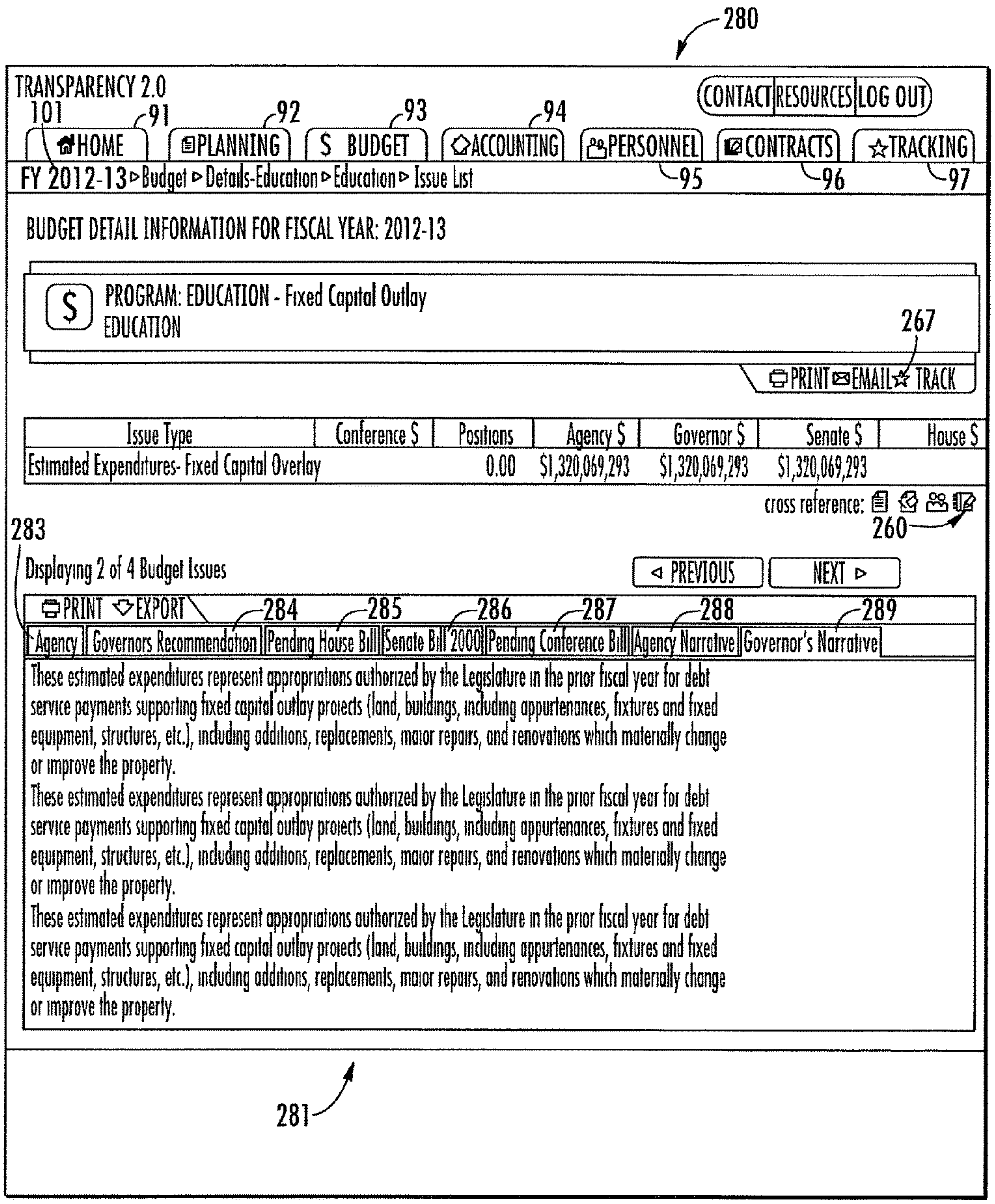

This view 280 also includes forward and backward buttons 279*a*-279*b* for readily navigating data related to list 275*a*-275*d* in the upper level view 270. The plurality of versions of the budget comprises an agency version 283, a Governor's recommendation version 284, a pending House bill version 285, a Senate bill version 286, a pending conference bill 287, an agency narrative 288, and a Governor's narrative 289. Advantageously, the user can quickly switch between varying versions of the State of Florida's budget, thereby enabling the user to readily pierce the obfuscation of the budgetary process. The pending House bill and the pending conference bill tabs 285, 287 are grayed out since these versions are unavailable. In particular, the budget information device 110 accessed the appropriate different financial databases 113*a*-113*c* and determined that there was no pending House committee data related to this item, and this is presented to the user via the grayed out tabs. Referring to FIGS. 14-16, the view 280 changes as the user cycles through the plurality of tabs 283-289. That is, the view 280 is providing access to the plurality of versions of the budget and narratives relating to the item.

Figure 17:
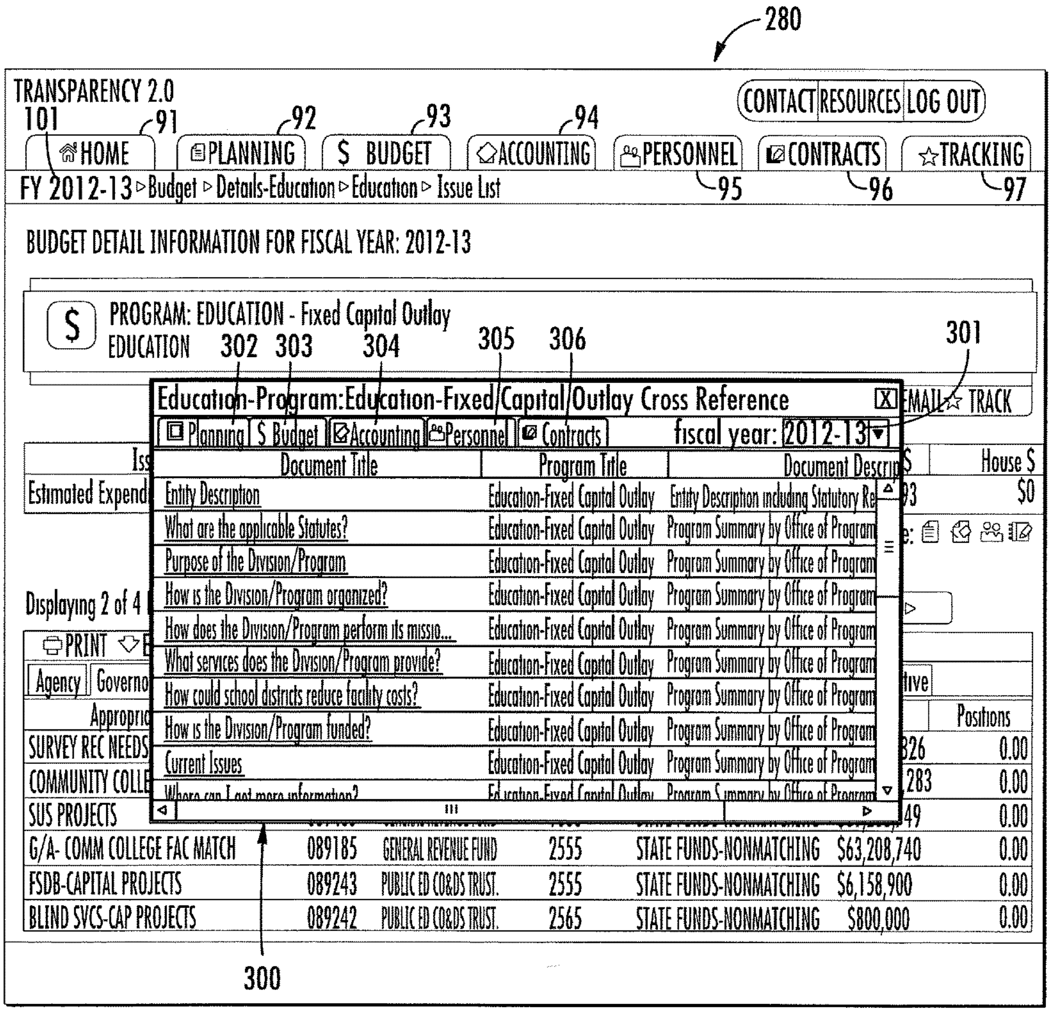
Figure 18:
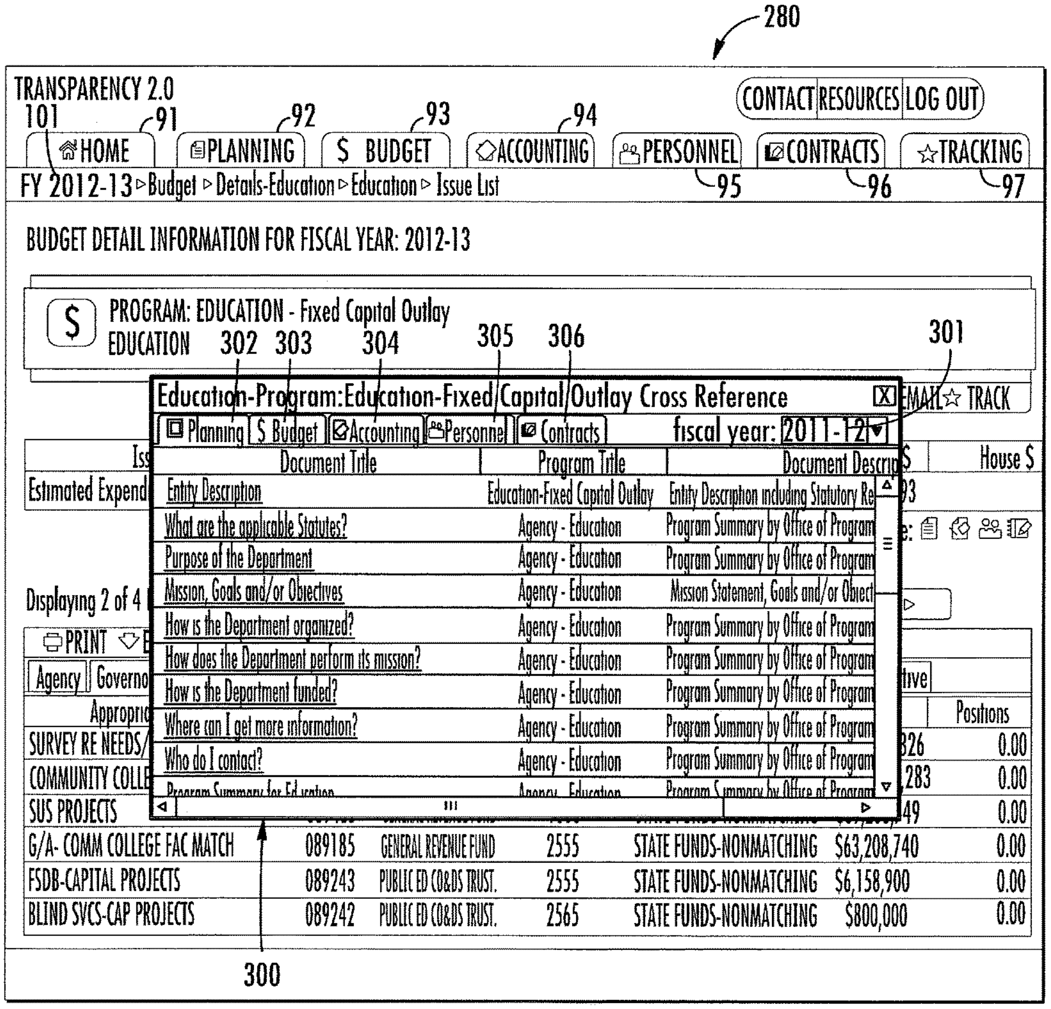
Figure 19:
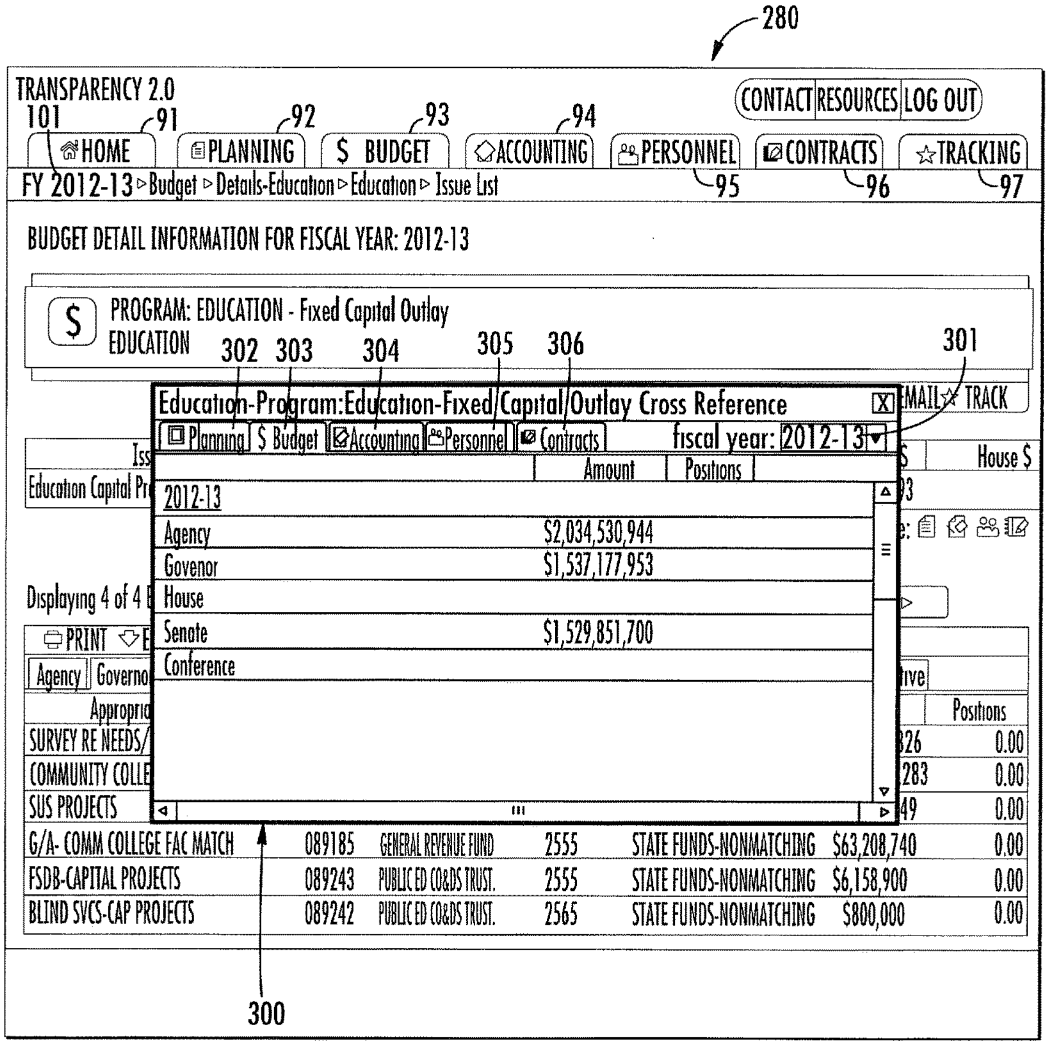

Now referring to FIGS. 17-18, once the cross-reference feature 260 is selected, the view 280 now illustratively includes a pop-up window 300 comprising a plurality of tabs 302-306 for accessing the numerical data and textual identifiers in respective different financial databases 113*a*-113*c* associated to the numerical data and textual identifiers in the current view 280. Helpfully, the user is navigated by default to the tab 302-306 related to the link 261-264 selected in the cross-reference feature 260. The pop-up window 300 illustratively includes a menu 301 comprising a plurality of fiscal year indicators for providing the cross-referenced numerical data and textual identifiers for each fiscal year (FIG. 17: 2012-2013, FIG. 18: 2011-2012).

Figure 20:
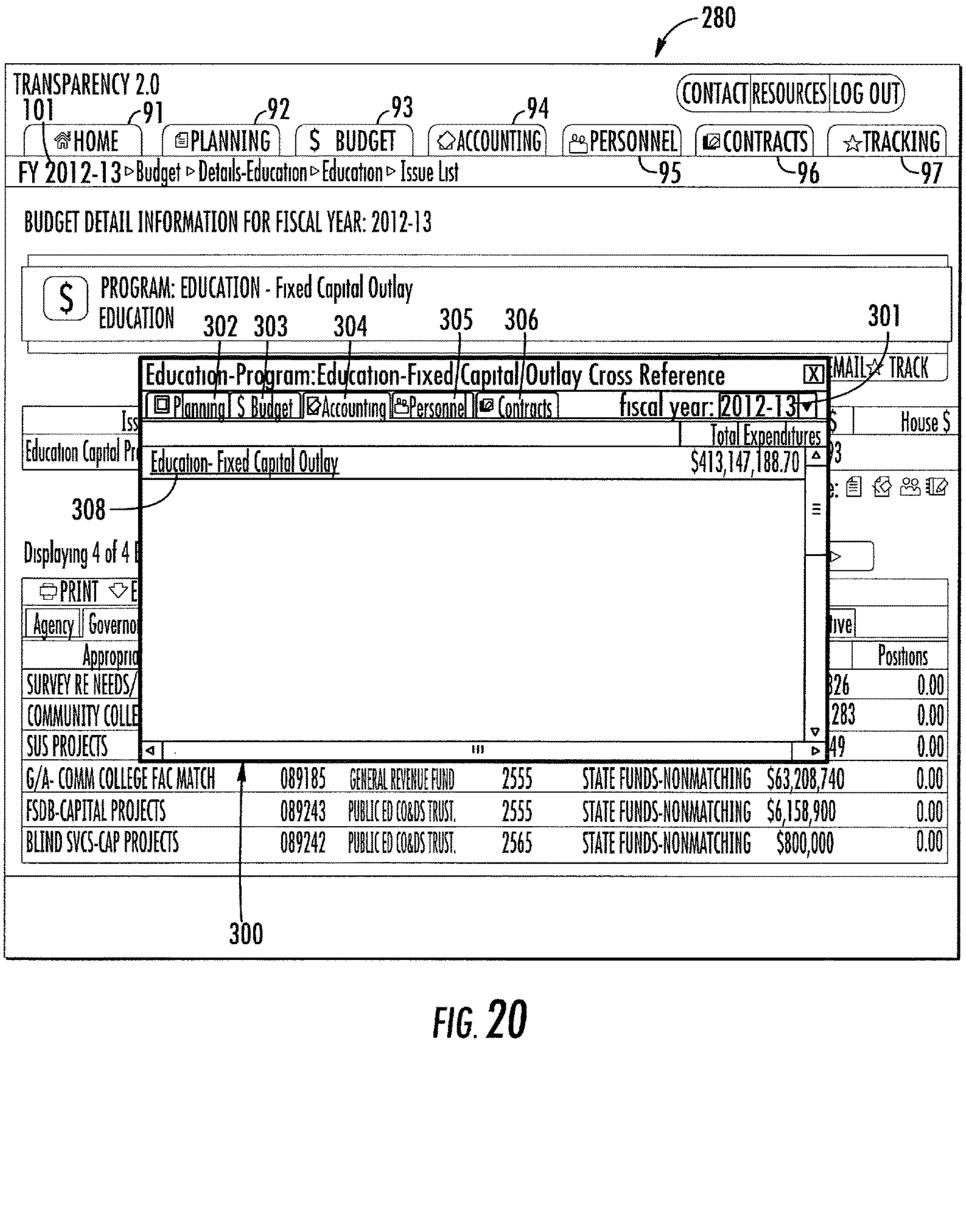
Figure 22:
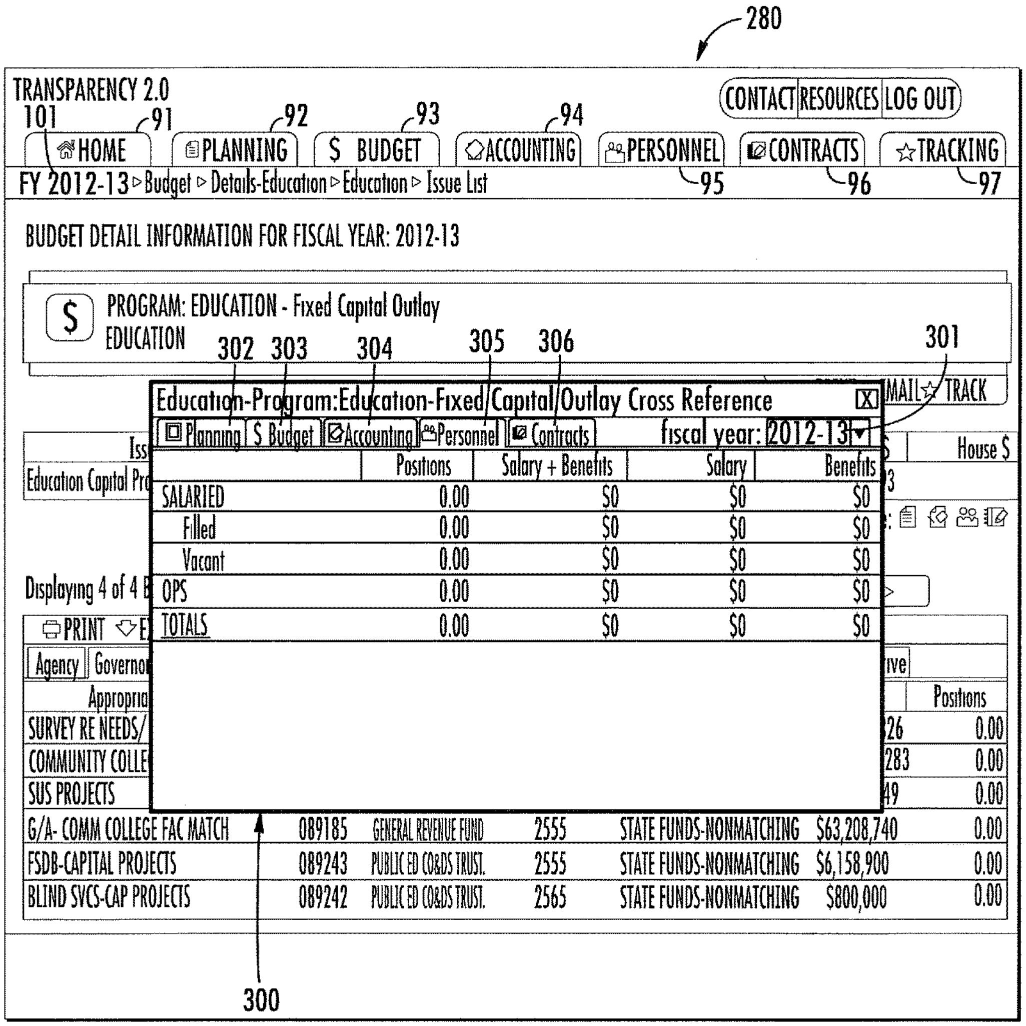
Figure 23:
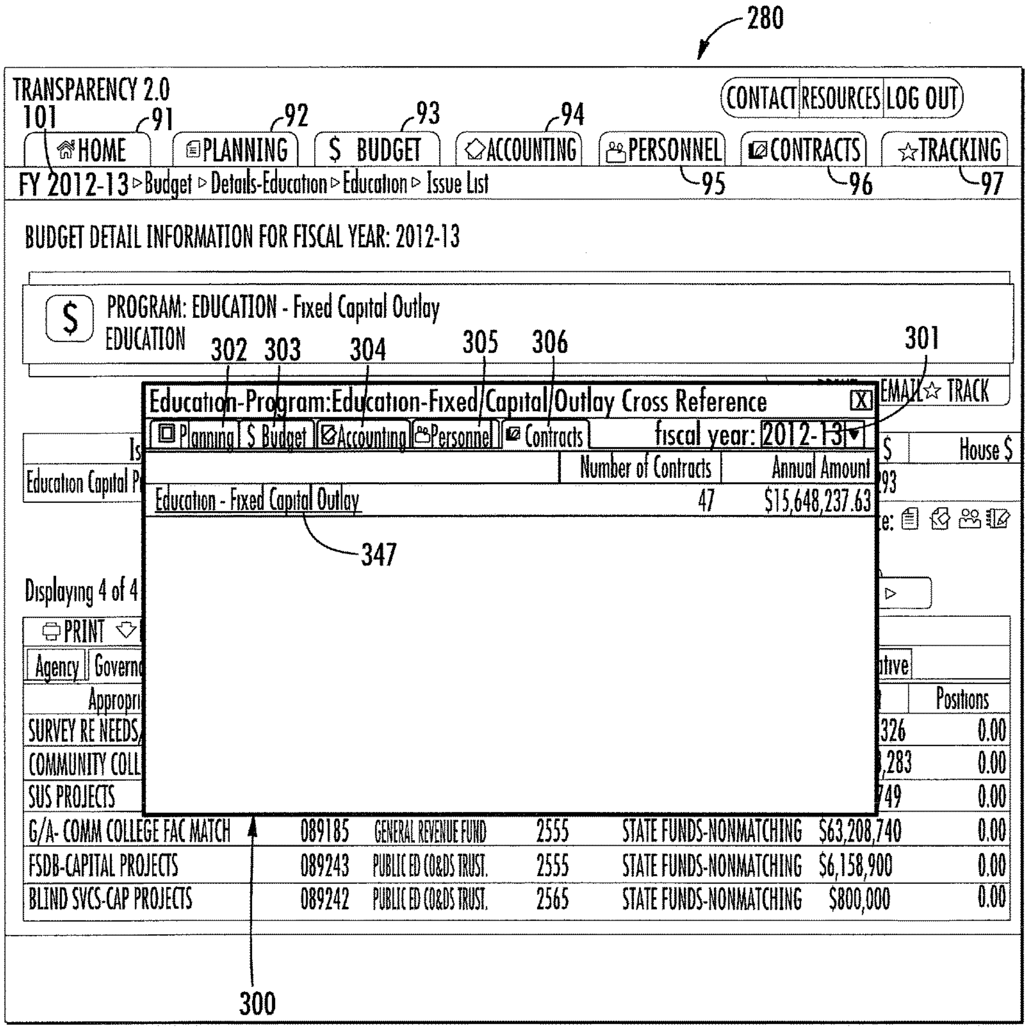

Referring to FIGS. 19-20 & 22-23, the view 280 changes as the user cycles through the plurality of tabs 302-306. That is, the view 280 is providing access to the cross-referenced data in each of the different financial databases 113*a*-113*c*. In particular, FIG. 20 shows the version of the pop-up window 300 including the cross-referenced data from the accounting database. Furthermore, with reference additionally to FIGS. 21 & 24, the user may select the displayed item 308 in the pop-up window 300, which quickly navigates the user to the appropriate data in the accounting view (module) 320. This view also illustratively includes a search feature 325 for quick access to desired data. Another view 340 shows the result of the selection of item 347 in the contracts tab 306 in the pop-up window 300. In this view 340, the user has been navigated to the appropriate location in the contracts database for access. This contracts view 340 also illustratively includes a search feature 342 for providing access to desired data in the contracts database. This view 340 also includes a panel 341 for providing a detailed view of the cross-referenced data item 347.

Another aspect is directed to a method for displaying budget information from a plurality of different financial databases 113*a*-113*c*. The method may comprise using a memory 111 and a processor 112 cooperating with the memory for importing and storing the plurality of different financial databases 113*a*-113*c* into the memory, each different financial database comprising numerical data and textual identifiers, processing the numerical data and textual identifiers from the plurality of different financial databases, and providing a GUI to a user, the GUI comprising a plurality of views 120, 140, 160, 180, 200, 220, 240 for respectively accessing the numerical data and textual identifiers for each of the plurality of different financial databases. Each view 120, 140, 160, 180, 200, 220, 240 comprises a cross-reference feature 260 for accessing numerical data and textual identifiers associated to numerical data and textual identifiers in a current view.

Figure 25:
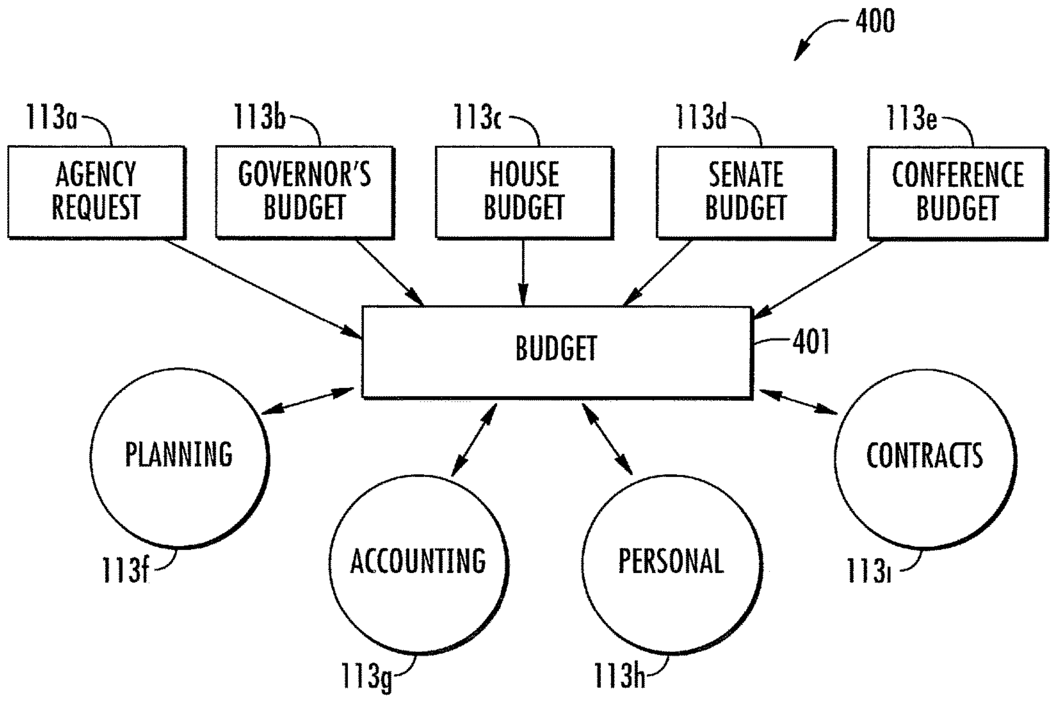
FIG. 25 is a schematic diagram of an exemplary application for the budget information system of FIG. 1.

Referring now to FIG. 25, a schematic diagram 400 shows the budget information device 110 accumulating the needed data for a budget financial database 401. In particular, the budget financial database 401 illustratively includes an agency request database 113*a*, a Governor's budget database 113*b*, a House budget database 113*c*, a Senate budget database 113*d*, and a conference committee budget database 113*e*, a planning database 113*f*, an accounting database 113*g*, a personnel database 113*h*, and a contracts database 113*i*. In this illustrated embodiment, the budget information device 110 is accessing each of the needed financial databases of the State of Florida to provide the comprehensive data to the user.

Figure 27:
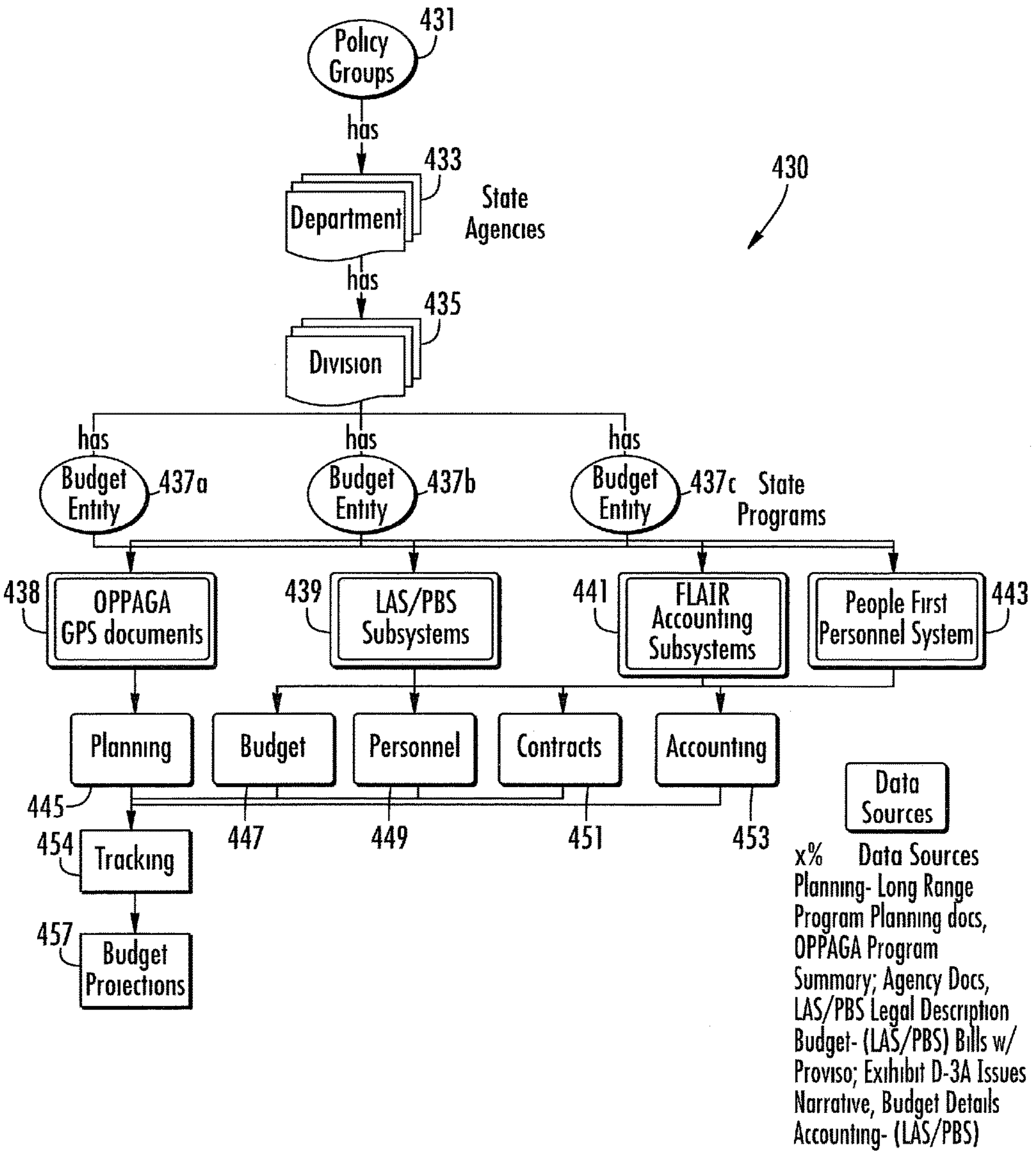
FIG. 27 is a flowchart illustrating operation of an exemplary application for the budget information system of FIG. 1.
Figure 28:
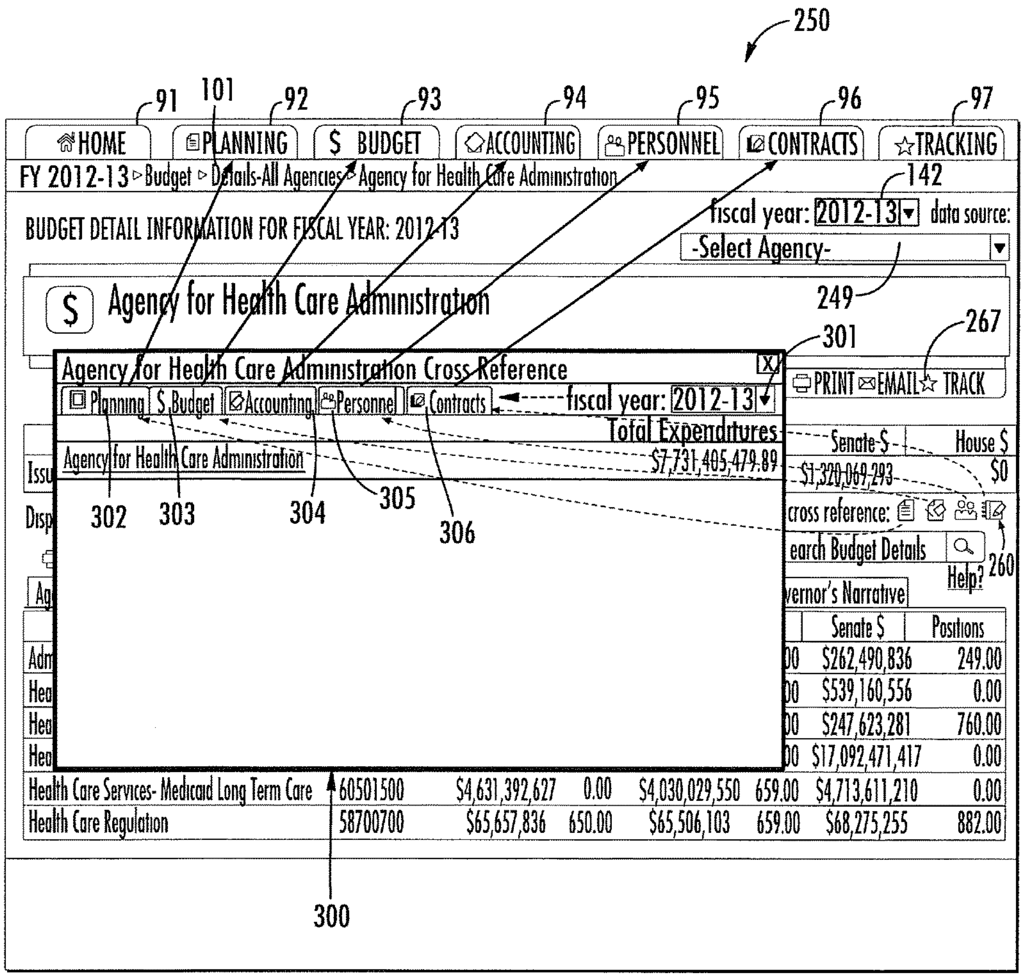

Referring now to FIG. 27, a flowchart 430 shows a method for the budget information device 110 accumulating data. As an initial premise and dividing logic, there are a plurality of policy groups, each comprising departments (i.e. state agencies), and each department comprises a plurality of divisions (Blocks 431, 433, 435). Each department comprises a plurality of budget entities 437*a*-437*c*, each providing appropriate financial data to the databases 113*a*-113*c* (Blocks 438-439, 441, 443). In this illustrated embodiment, the databases comprise an Office of Program Policy Analysis and Government Accountability (OPPAGA) database 438, a Legislative Appropriations System (LAS)/Planning Budget Subsystem (PBS) database 439, a Florida Accounting Information Resource Subsystem (FLAIR) database 441, and a People First Subsystem (PFS) database 443. As will be appreciated, these databases 438-439, 441, 443 are made public and accessible due to demands of transparency laws in the State of Florida. The budget information device 110 mines each of these databases and generates a planning database 445, a budget database 447, a personnel database 449, a contracts database 451, and an accounting database 453. The budget information device 110 may generate a tracking database 454 based upon the selections from the tracking feature 267 noted above, and may generate a budget projection database 457 based upon the mined data.

Figure 26:
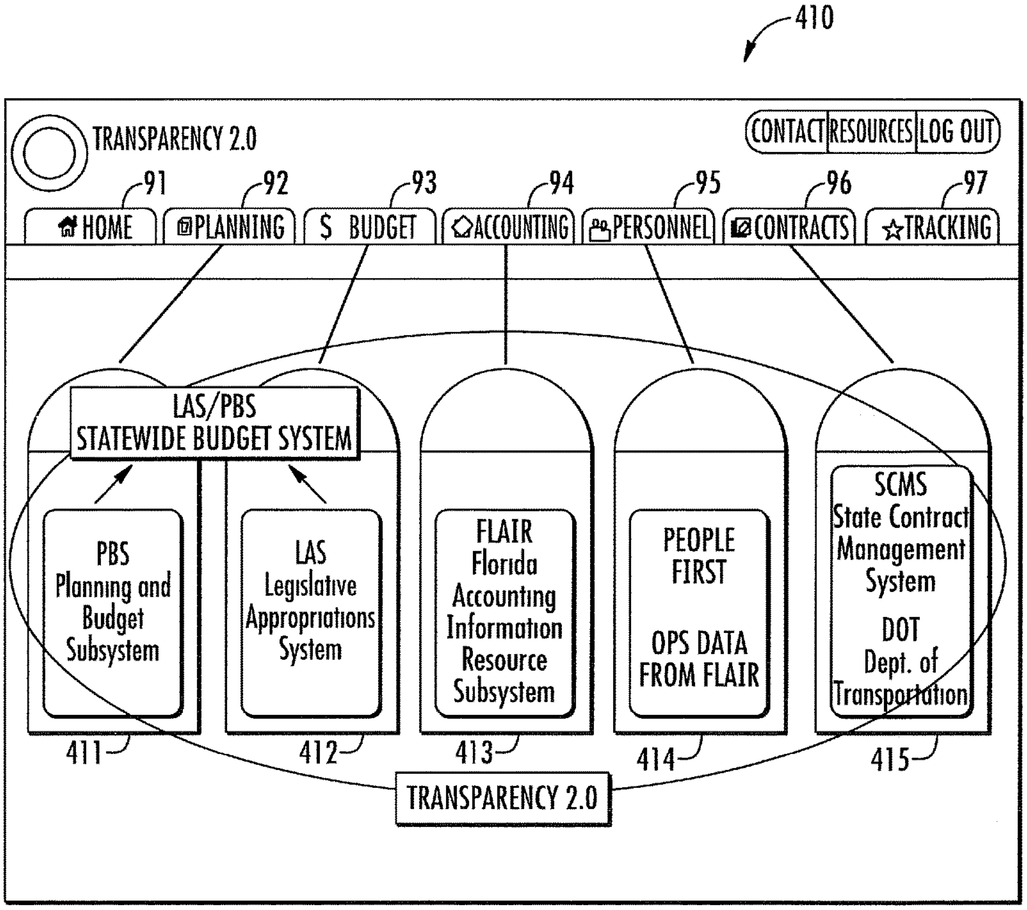
FIG. 26 is another schematic diagram of an exemplary application for the budget information system of FIG. 1.

Referring now to FIG. 26, a schematic diagram 410 shows exemplary databases (State of Florida) that the budget information device 110 may access to provide the data for the GUI. In particular, the data from the view 140 of planning (module) data is derived from a PBS 411; the data from the view 280 of budget (module) data is derived from a LAS/PBS 412; the data from the view 160 of accounting (module) data is derived from a FLAIR 413; the data from the view 180 of personnel (module) data is derived from a PFS 414 (i.e. OPS data from FLAIR); and the data from the view 200 of contracts (module) data is derived from a State Contract Management System (SCMS) and Department of Transportation (DOT) system 415.

The cross-reference 260 feature permits a user to seamlessly navigate across the State of Florida's separate systems, represented in Transparency 2.0 by the five main modules (views): Planning, Budget, Accounting, Personnel and Contracts. Data for these five modules is stored on completely separate computer platforms within State of Florida government. The cross-reference feature 260 permits the vertical and horizontal data mining of systems and data stored on these otherwise independent information sources. One way to visualize the full potential and power of the Cross Reference feature within Transparency 2.0 is to think of the state government's data as being held in five separate silos, each a separate and independent computer system. Transparency 2.0 seamlessly integrates these five separate systems of government and gives the user tools to research, compare and analyze this information, all from a single source.

The potential key to cross-referencing the data is the codes used across all systems, primarily the budget entity. The following Table 1 displays the key codes or fields that are shared between modules or are unique to a particular module.

TABLE 1

Codes and Fields Shared Between Modules

| | Planning | Budget Bill | Budget Details | Accounting | Personnel | Contracts |
|---|---|---|---|---|---|---|
| Fiscal Year | X | X | X | X | X | X |
| Section | | X | X | | | |
| Budget Entity* | X | X | X | X | X | X |
| Appropriation Category | | X | X | X | | X |
| Fund | | X | X | X | | |
| Fund Source | | X | X | | | |
| Issue Type | | X | X | | | |
| Issue Code | | X | X | | | |
| Object Code | | | | X | | |
| Contract No. | | | | X | | X |
| Dollars | | X | X | X | X | X |
| FTE/Position Data | | X | X | | X | |

By using the cross-reference feature 260, the user can view how the resources of the State of Florida are being planned and managed (Planning), what funds are being requested and budgeted (Budget), how and where the tax dollars are being spent (Accounting), who makes up the State's workforce (Personnel), and who benefits from state contracts (Contracts) by moving quickly from one module to the next all within one window.

Referring now additionally to FIGS. 28-31, the view 250 of the budget data with annotations is shown. The cross-reference feature 260 and associated pop-up window 300 is accessed via the icons therein (dashed lines connecting the icon to the appropriate cross-reference tab 302-206). There are five cross-reference icons representing the five main modules of data located directly below the Summary Grid for all modules except Planning.

Figure 30:
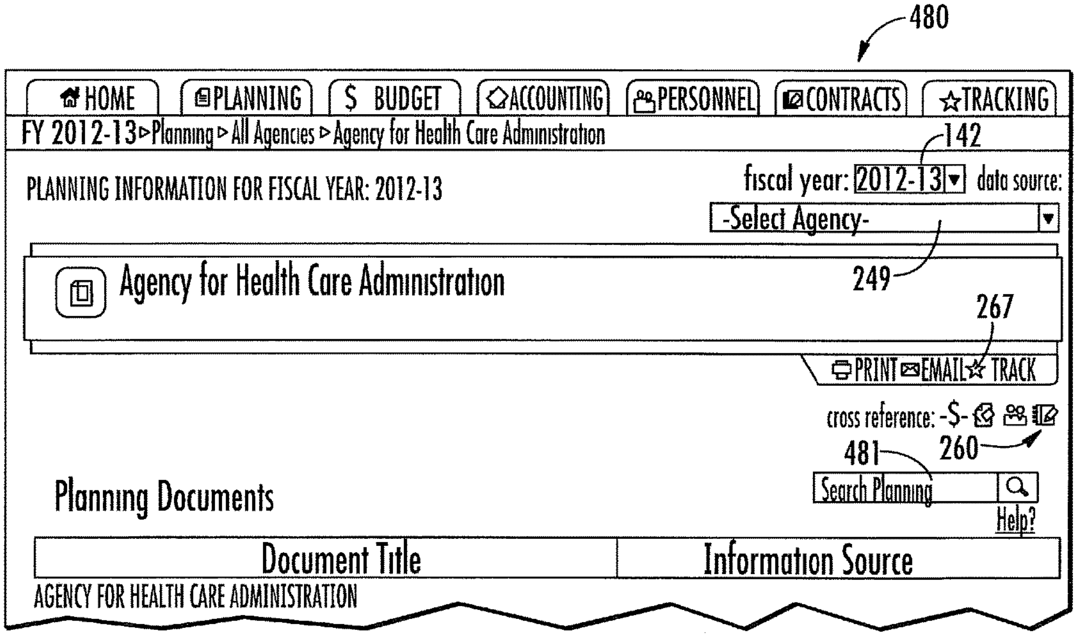

Once the planning tab 302 is selected, the user is navigated to the view 480 of the planning data (view 480 split between FIGS. 30 & 31). Again, the view 480 illustratively includes a search feature 481 for accessing desired data. For the Planning Module the cross-reference feature 260 is located directly below the header bar.

As the user drills down through agencies and individual programs, the cross-reference feature 260 remains available to show the user very specific data from other modules as it relates to the Budget Group, Agency, or Program (i.e. tier of government) that is currently being viewed. If the user finds something of interest that may warrant further examination, the user need only click on the entry and be taken to that specific data area within another module.

Referring now to FIGS. 29-44, the following are examples for each of the five modules with a screen shot displaying the information that can be viewed from within the cross-reference pop-up window 300, from any of the other modules, and then a comparison screen shot of the same information that would be viewed by going directly to that module. All examples are for the Health Care Regulation program (code 68700700) in the Agency for Health Care Administration.

Figure 29:
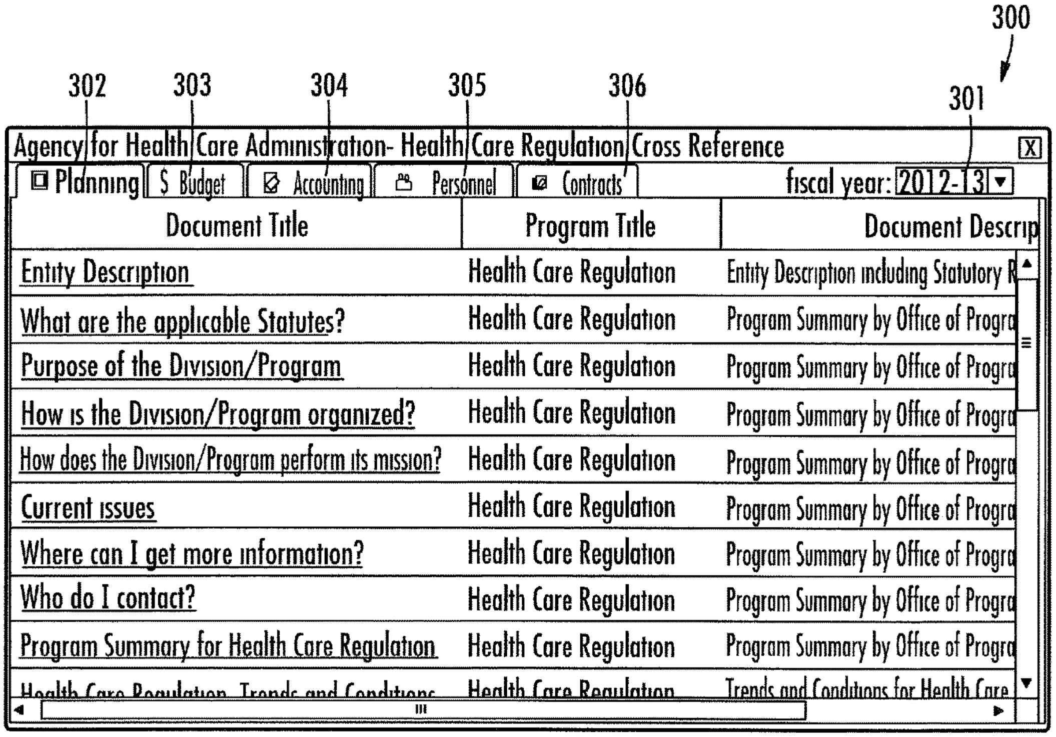

FIGS. 29-31 demonstrate the cross-reference to Planning Module. FIG. 32 shows a pop-up window 510 with cross-reference data. By selecting the budget tab 515 (circled), the user is navigated to the budget view 520 (FIG. 33). This view 520 from the budget module illustratively includes a list of items for totals by program. By selecting item "health care regulation" 525, the user navigates one level lower in the budget module (FIG. 34).

Figure 35:
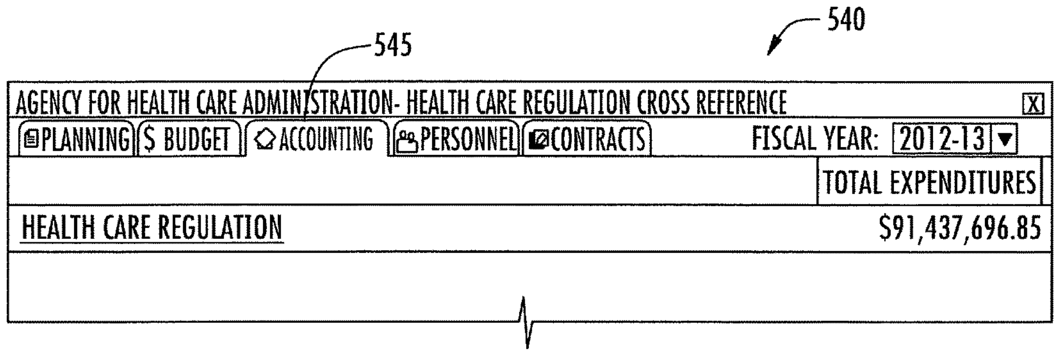
Figure 36:
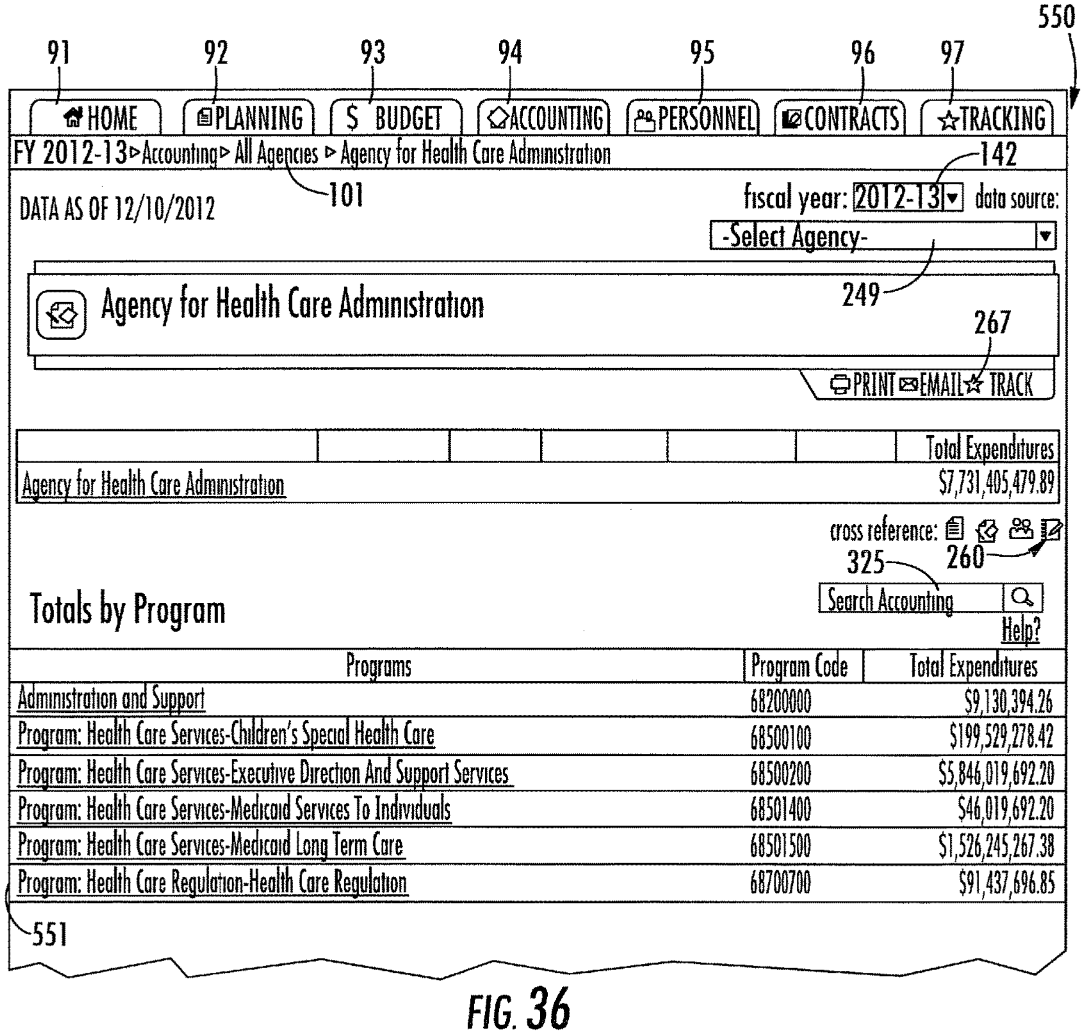
Figure 44:
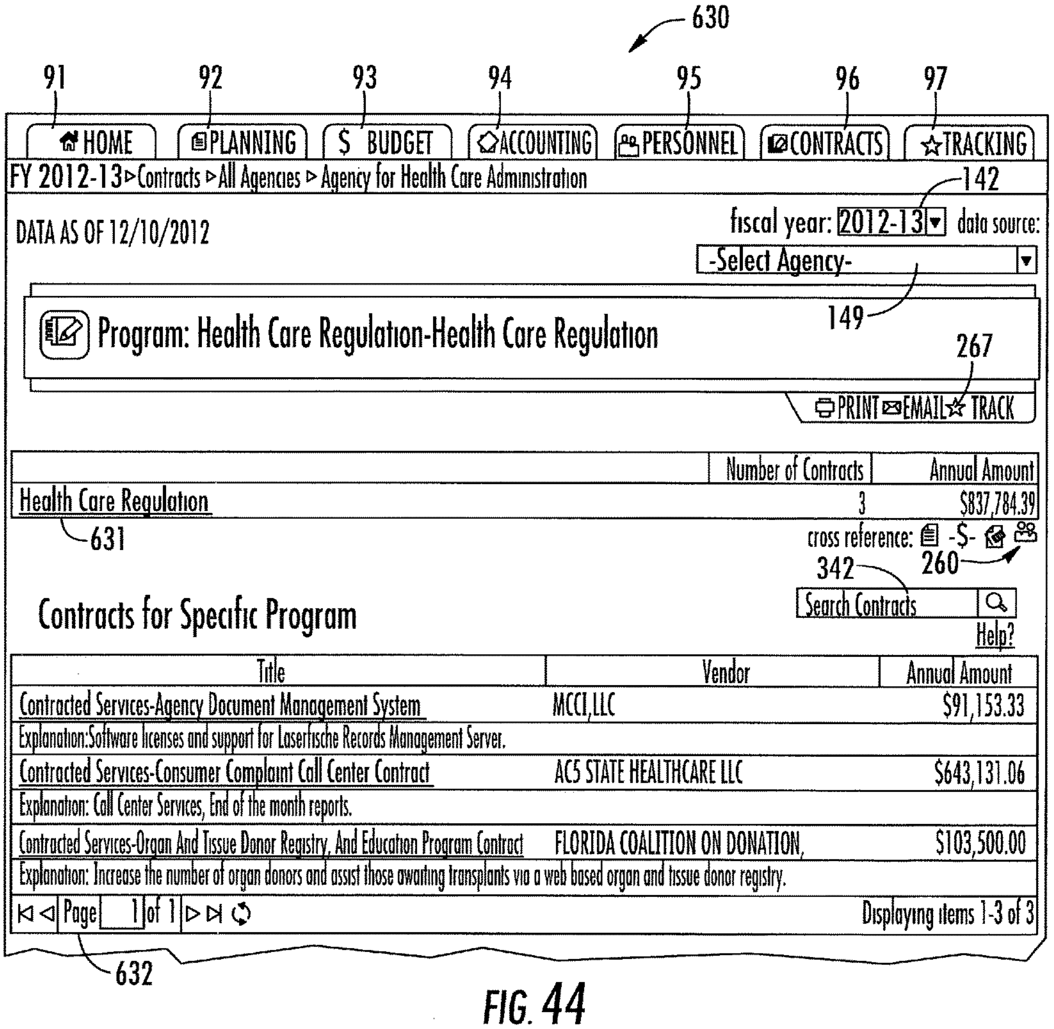

FIG. 34 includes a view 530 from the budget module that lists the budget issues for the selected program. FIG. 35 shows a pop-up window 540 from selecting the cross-reference feature 260 of the view 530. By selecting the accounting tab 545 (circled), the user is navigated to the budget view 550 (FIG. 36). By selecting the "Health Care Regulation" item 551, the user is navigated to another lower level view 560. This view 560 includes a panel 565 showing conglomerate expenditure for the selected program, and another panel 566 including a list of items and associated expenditures and item codes. The panel 566 also includes a menu 567 for selecting the viewing arrangement of the list of items. Either the user may view the information based upon the object codes or the vendor. FIGS. 31-38 show views demonstrating the data switching between object code and vendor views, respectively 560, 570.

FIGS. 39-40 show a view 590 for demonstrating the cross-reference to the personnel module. The cross-reference pop-up window 580 illustratively includes a plurality of tabs, including a personnel tab 585. By selecting the personnel tab 585, the user is navigated to the personnel module (FIG. 40) of the GUI.

The view 590 illustratively includes a menu 596 for showing differing types of positions, namely: all, salaried, vacant, and Other Personal Services Employment (OPS), i.e. at-will employment. In other words, one the user has navigated to the personnel module data related to the program of interest, the user may quickly sort the positions. Additionally, the personnel view 590 illustratively includes a search feature 595. By selecting item 598 in the view 590, the user is navigated to view 600 (FIG. 41) in the personnel module. This view 600 illustratively includes a panel 605 providing detailed financial data on the personnel for the related item. By stepping through the contracts tab 612 in the cross-reference data pop-up window 610 (FIG. 42), the user is navigated to a view 620 (FIG. 43) in the contracts module.

Now, by selecting item 621 in view 620, the user is navigated to view 630. This view 630 includes a general information panel 631 providing conglomerate contract amounts and numbers thereof, and a second panel 632. The second panel 632 includes contracts for specific programs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A budget information system comprising:

a plurality of computer systems configured to respectively store and maintain a plurality of different financial databases, each different financial database being associated with a respective organizational entity; and a web server comprising a memory and a processor cooperating with said memory, said processor configured to communicate with said plurality of computer systems, and importing and storing the plurality of different financial databases into said memory, each different financial database comprising different numerical data and textual identifiers, the different numerical data and textual identifiers for each different financial database being different from other numerical data and textual identifiers in other different financial databases, process the different numerical data and textual identifiers from said plurality of different financial databases, provide a graphical user interface (GUI) to a user, the GUI comprising a plurality of menus for respectively accessing the different numerical data and textual identifiers for each of said plurality of different financial databases, each menu comprising a cross-reference icon for accessing numerical data and textual identifiers in other different financial databases and associated to numerical data and textual identifiers in a current menu, for each menu, a plurality of vertical submenu levels corresponding to a plurality of divisional levels within the respective organizational entity, each vertical submenu level comprising a sub-menu cross-reference icon for accessing numerical data and textual identifiers in other different financial databases and associated to numerical data and textual identifiers in a current vertical sub-menu, a tracking menu comprising different numerical data and textual identifiers for a plurality of user-selected items, use shared codes and fields from each of the plurality of different financial databases to generate the numerical data and textual identifiers in the other different financial databases and associated to the numerical data and textual identifiers in the current menu, and update the different numerical data and textual identifiers for the plurality of user-selected items from the plurality of different financial databases.

2. The budget information system of claim 1 wherein the cross-reference icon provides a pop-up window comprising a plurality of tabs for accessing the numerical data and textual identifiers in respective different financial databases associated to the numerical data and textual identifiers in the current menu.

3. The budget information system of claim 1 wherein each menu comprises a plurality of fiscal year indicators for providing different numerical data and textual identifiers for each fiscal year.

4. The budget information system of claim 1 wherein each menu comprises a home screen providing a general overview of the different numerical data and textual identifiers for the corresponding different financial database.

5. The budget information system of claim 1 wherein the plurality of different financial databases comprises a planning database, a budget database, an accounting database, a personnel database, and a contracts database.

6. The budget information system of claim 5 wherein the menu for the budget database comprises a plurality of tabs for accessing a plurality of versions of a budget.

7. The budget information system of claim 1 wherein said GUI comprises a plurality of tabs for selecting the plurality of menus for accessing the different numerical data and textual identifiers for said plurality of different financial databases.

8. The budget information system of claim 1 wherein the different numerical data and textual identifiers comprise a monetary cost and item description.

9. The budget information system of claim 1 wherein said GUI comprises a web page based user interface.

* * * * *